US012738200B2

(12) United States Patent
Wang et al.

(10) Patent No.: US 12,738,200 B2
(45) Date of Patent: Sep. 15, 2026

(54) DISPLAY DEVICE HAVING DATA LINES LOCATED ON OPPOSITE SIDES OF SUBPIXEL DRIVING CIRCUITS

(71) Applicants: CHENGDU BOE OPTOELECTRONICS TECHNOLOGY CO., LTD., Chengdu (CN); BOE TECHNOLOGY GROUP CO., LTD., Beijing (CN); BEIJING BOE TECHNOLOGY DEVELOPMENT CO., LTD., Beijing (CN)

(72) Inventors: Zhu Wang, Beijing (CN); Zhongman Zhao, Beijing (CN); Fei Fang, Beijing (CN); Ling Shi, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/994,432

(22) PCT Filed: May 14, 2024

(86) PCT No.: PCT/CN2024/093080

§ 371 (c)(1),
(2) Date: Jan. 14, 2025

(87) PCT Pub. No.: WO2024/255503

PCT Pub. Date: Dec. 19, 2024

(65) Prior Publication Data

US 2026/0018107 A1 Jan. 15, 2026

(30) Foreign Application Priority Data

Jun. 13, 2023 (CN) ........................ 202310699677.8

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01);
(Continued)

(58) Field of Classification Search
CPC ........................................................ G09G 3/32
(Continued)

(56) References Cited

U.S. PATENT DOCUMENTS

2012/0012853 A1* 1/2012 Kasahara ............. G09G 3/3607
257/E29.273
2017/0061928 A1* 3/2017 Kim ..................... G09G 3/3685
(Continued)

FOREIGN PATENT DOCUMENTS

CN 109119028 A 1/2019
CN 113272963 A 8/2021
(Continued)

OTHER PUBLICATIONS

European Search Report for European Application No. 24822455.2 mailed Mar. 20, 2026, 12 pages.

*Primary Examiner* — Long D Pham
(74) *Attorney, Agent, or Firm* — BROOKS KUSHMAN P.C.

(57) ABSTRACT

A display substrate and a display device are provided. The display substrate includes a base substrate, and a plurality of subpixels and a plurality of data lines arranged on the base substrate. The subpixel includes a subpixel driving circuit and a light-emitting element coupled to each other. A
(Continued)

plurality of subpixel driving circuits included in the plurality of subpixels includes a plurality of driving circuit columns, the driving circuit column includes a plurality of subpixel driving circuits arranged in a first direction, the plurality of driving circuit columns includes a plurality of column units, and the column unit includes at least two adjacent driving circuit columns. The data line coupled to the subpixel driving circuits in the column unit are arranged at a first side and/or a second side of the column unit, the first side is opposite to the second side in a second direction intersecting the first direction.

16 Claims, 27 Drawing Sheets

(52) U.S. Cl.
CPC ............... *G09G 2320/0209* (2013.01); *G09G 2330/021* (2013.01)

(58) Field of Classification Search
USPC ............................................................ 345/55
See application file for complete search history.

(56) References Cited

U.S. PATENT DOCUMENTS

| | | | | |
|---|---|---|---|---|
| 2017/0076665 | A1* | 3/2017 | Kim | G09G 3/3225 |
| 2024/0078971 | A1 | 3/2024 | Han et al. | |

FOREIGN PATENT DOCUMENTS

| | | | |
|---|---|---|---|
| CN | 114127934 | A | 3/2022 |
| CN | 115734681 | A | 3/2023 |
| CN | 115804262 | A | 3/2023 |
| WO | 2022226845 | A1 | 11/2022 |
| WO | 2022267016 | A1 | 12/2022 |

* cited by examiner

DISPLAY DEVICE HAVING DATA LINES LOCATED ON OPPOSITE SIDES OF SUBPIXEL DRIVING CIRCUITS

CROSS-REFERENCE TO RELATED APPLICATION APPLICATIONS

This application is the U.S. national phase of PCT Application No. PCT/CN2024/093080 filed on May 14, 2024, which claims priority to Chinese Patent Application No. 202310699677.8 filed on Jun. 13, 2023, which are incorporated herein by reference in their entireties.

TECHNICAL FIELD

The present disclosure relates to the field of display technology, in particular to a display substrate and a display device.

BACKGROUND

Along with the continuous development of the display technology, a display product has been more and more widely applied, and the requirement on display quality of the display product becomes higher and higher. In order to achieve high-quality display, a subpixel driving circuit in a subpixel is required to have high stability. Currently, in a case that a data signal transmitted through a data line in the display product changes, the stability of key nodes in the subpixel driving circuit may be greatly influenced, and thereby the stability of the subpixel driving circuit may be influenced. Hence, there is an urgent need to improve the operating stability of the subpixel driving circuit.

SUMMARY

An object of the present disclosure is to provide a display substrate and a display device, so as to solve the above-mentioned problem.

In order to achieve the above object, the present disclosure provides the following technical solutions.

In one aspect, the present disclosure provides in some embodiments a display substrate, including a base substrate, and a plurality of subpixels and a plurality of data lines arranged on the base substrate, each of the subpixels including a subpixel driving circuit and a light-emitting element coupled to each other. A plurality of subpixel driving circuits included in the plurality of subpixels includes a plurality of driving circuit columns, each of the driving circuit columns includes a plurality of subpixel driving circuits arranged in a first direction, the plurality of driving circuit columns includes a plurality of column units, each of the column units includes at least two driving circuit columns proximate to each other, the data lines coupled to the subpixel driving circuits included in the column unit are located at a first side and/or a second side of the column unit, the first side is opposite to the second side in a second direction, and the second direction intersects the first direction.

In a possible embodiment of the present disclosure, the column unit includes at least one first driving circuit column and at least one second driving circuit column, and the first driving circuit columns and the second driving circuit columns are arranged alternately in the second direction. The first driving circuit column includes a plurality of first subpixel driving circuits and a plurality of second subpixel driving circuits, the first subpixel driving circuits and the second subpixel driving circuits are arranged alternately in the first direction, the first subpixel driving circuit is coupled to a first-color light-emitting element, the second subpixel driving circuit is coupled to a second-color light-emitting element, the first subpixel driving circuits in the first driving circuit column are coupled to a same data line, and the second subpixel driving circuits in the first driving circuit column are coupled to a same data line. The subpixel driving circuit in the second driving circuit column is coupled to a third-color light-emitting element, and the subpixel driving circuits in the second driving circuit column are coupled to a same data line.

In a possible embodiment of the present disclosure, the data line coupled to the first subpixel driving circuits in the first driving circuit column and the data line coupled to the second subpixel driving circuits in the first driving circuit column are arranged at the first side of the column unit, and the data line coupled to the subpixel driving circuits in the second driving circuit column are arranged at the second side of the column unit.

In a possible embodiment of the present disclosure, the column unit includes two first driving circuit columns and two second driving circuit columns, the first subpixel driving circuits included in the two first driving circuit columns are coupled to a same first data line, the second subpixel driving circuits included in the two first driving circuit columns are coupled to a same second data line, third subpixel driving circuits included in a first one of the second driving circuit columns are coupled to a same third data line, and fourth subpixel driving circuits included in a second one of the second driving circuit columns are coupled to a same fourth data line. The first data line, the second data line, the third data line and the fourth data line are arranged sequentially in the second direction.

In a possible embodiment of the present disclosure, the column unit includes a plurality of sub-units arranged sequentially in the first direction, and each of the sub-units includes two driving circuit rows arranged in the first direction. A first one of the driving circuit rows includes the first subpixel driving circuit, the third subpixel driving circuit, the second subpixel driving circuit and the fourth subpixel diving circuit arranged sequentially in the second direction, and a second one of the driving circuit rows includes the second subpixel driving circuit, the third subpixel driving circuit, the first subpixel driving circuit and the fourth subpixel driving circuit arranged sequentially in the second direction. The first data line and the second data line are arranged at the first side of the column unit, and the third data line and the fourth data line are arranged at the second side of the column unit.

In a possible embodiment of the present disclosure, the first subpixel driving circuit in the first one of the driving circuit rows includes a driving transistor and a data write-in transistor, a second electrode of the data write-in transistor is coupled to a second electrode of the driving transistor, and the first data line is coupled to a first electrode of the data write-in transistor via a first conductive connection member. The data write-in transistor includes a data write-in active layer, and an orthogonal projection of the data write-in active layer onto the base substrate is arranged between a first data body included in the first data line onto the base substrate and an orthogonal projection of a second data body included in the second data line onto the base substrate.

In a possible embodiment of the present disclosure, the display substrate further includes a reference signal line and an initialization signal line. The first conductive connection member includes a first sub-portion and a second sub-portion coupled to each other, the first sub-portion extends in the second direction, the second sub-portion extends in the first direction, the first sub-portion is coupled to the first data line, and the second sub-portion is coupled to the first electrode of the data write-in transistor. At least a part of an orthogonal projection of the first sub-portion onto the base substrate is arranged between an orthogonal projection of the reference signal line onto the base substrate and an orthogonal projection of the initialization signal line onto the base substrate.

In a possible embodiment of the present disclosure, the first subpixel driving circuit in the second one of the driving circuit rows includes a driving transistor and a data write-in transistor, a second electrode of the data write-in transistor is coupled to a second electrode of the driving transistor, and the first data line is coupled to a first electrode of the data write-in transistor via a second conductive connection member. The data write-in transistor includes a data write-in active layer, and an orthogonal projection of the data write-in active layer onto the base substrate is arranged between an orthogonal projection of a second data body included in the second data line onto the base substrate and an orthogonal projection of a third data body included in the third data line onto the base substrate.

In a possible embodiment of the present disclosure, the second conductive connection member includes a third sub-portion and a fourth sub-portion coupled to each other, a least a part of the third sub-portion extends in the second direction, a least a part of the fourth sub-portion surrounds a sensing aperture region of the display substrate, the third sub-portion is coupled to the first data line, and the fourth sub-portion is coupled to the first electrode of the data write-in transistor.

In a possible embodiment of the present disclosure, the display substrate further includes a reference signal line and an initialization signal line, and an orthogonal projection of the third sub-portion onto the base substrate is arranged between an orthogonal projection of the reference signal line onto the base substrate and an orthogonal projection of the initialization signal line onto the base substrate. An orthogonal projection of the fourth sub-portion onto the base substrate at least partially overlaps with the orthogonal projection of the initialization signal line onto the base substrate, and/or the orthogonal projection of the fourth sub-portion onto the base substrate at least partially overlaps with the orthogonal projection of the reference signal line onto the base substrate.

In a possible embodiment of the present disclosure, the second subpixel driving circuit in the first one of the driving circuit rows includes a driving transistor and a data write-in transistor, a second electrode of the data write-in transistor is coupled to a second electrode of the driving transistor, and the second data line is coupled to a first electrode of the data write-in transistor via a third conductive connection member. The data write-in transistor includes a data write-in active layer, and an orthogonal projection of the data write-in active layer onto the base substrate is arranged between an orthogonal projection of a second data body included in the second data line onto the base substrate and an orthogonal projection of a third data body included in the third data line onto the base substrate.

In a possible embodiment of the present disclosure, the display substrate further includes a first scanning line, the second subpixel driving circuit in the first one of the driving circuit rows further includes a compensation transistor, a first electrode of the compensation transistor is coupled to a first electrode of the driving transistor, a second electrode of the compensation transistor is coupled to a gate electrode of the driving transistor, and a gate electrode of the compensation transistor is coupled to a corresponding first scanning line. The third conductive connection member includes a fifth sub-portion and a sixth sub-portion coupled to each other, the fifth sub-portion is coupled to the second data line, the sixth sub-portion is coupled to the first electrode of the data write-in transistor, and an orthogonal projection of the fifth sub-portion onto the base substrate at least partially overlaps with an orthogonal projection of the first scanning line onto the base substrate.

In a possible embodiment of the present disclosure, the second subpixel driving circuit in the second one of the driving circuit rows includes a driving transistor and a data write-in transistor, a second electrode of the data write-in transistor is coupled to a second electrode of the driving transistor, and the second data line is coupled to a first electrode of the data write-in transistor via a fourth conductive connection member. The data write-in transistor includes a data write-in active layer, and an orthogonal projection of the data write-in active layer onto the base substrate is arranged between an orthogonal projection of a first data body included in the first data line onto the base substrate and an orthogonal projection of a second data body included in the second data line onto the base substrate.

In a possible embodiment of the present disclosure, the display substrate further includes a second scanning line, and a gate electrode of the data write-in transistor is coupled to a corresponding second scanning line. The fourth conductive connection member includes a seventh sub-portion and an eighth sub-portion coupled to each other, the seventh sub-portion extends in the second direction, the eighth sub-portion extends in the first direction, the seventh sub-portion is coupled to the second data line, and the eighth sub-portion is coupled to the first electrode of the data write-in transistor. At least a part of the seventh sub-portion onto the base substrate is arranged between an orthogonal projection of the second scanning line onto the base substrate and an orthogonal projection of a gate electrode of the driving transistor onto the base substrate.

In a possible embodiment of the present disclosure, the third subpixel driving circuit in the first one of the driving circuit rows includes a driving transistor and a data write-in transistor, a second electrode of the data write-in transistor is coupled to a second electrode of the driving transistor, and the third data line is coupled to a first electrode of the data write-in transistor via a fifth conductive connection member. The data write-in transistor includes a data write-in active layer, and an orthogonal projection of the data write-in active layer onto the base substrate is arranged between an orthogonal projection of a second data body included in the second data line onto the base substrate and an orthogonal projection of a third data body included in the third data line onto the base substrate.

In a possible embodiment of the present disclosure, the fifth conductive connection member includes a ninth sub-portion and a tenth sub-portion coupled to each other, at least a part of the ninth sub-portion extends in the second direction, at least a part of the tenth sub-portion surrounds a sensing aperture region of the display substrate, the ninth sub-portion is coupled to the third data line, and the tenth sub-portion is coupled to the first electrode of the data write-in transistor.

In a possible embodiment of the present disclosure, the display substrate further includes a reference signal line and an initialization signal line, and at least a part of an orthogonal projection of the ninth sub-portion onto the base substrate is arranged between an orthogonal projection of the reference signal line onto the base substrate and an orthogonal projection of the initialization signal line onto the base substrate. An orthogonal projection of the tenth sub-portion onto the base substrate at least partially overlaps with the orthogonal projection of the initialization signal line onto the base substrate, and/or the orthogonal projection of the tenth sub-portion onto the base substrate at least partially overlaps with the orthogonal projection of the reference signal line onto the base substrate.

In a possible embodiment of the present disclosure, the third subpixel driving circuit in the second one of the driving circuit rows includes a driving transistor and a data write-in transistor, a second electrode of the data write-in transistor is coupled to a second electrode of the driving transistor, and the third data line is coupled to a first electrode of the data write-in transistor via a sixth conductive connection member. The data write-in transistor includes a data write-in active layer, and an orthogonal projection of the data write-in active layer onto the base substrate is arranged between an orthogonal projection of a second data body included in the second data line onto the base substrate and an orthogonal projection of a third data body included in the third data line onto the base substrate.

In a possible embodiment of the present disclosure, the display substrate further includes a second scanning line, and a gate electrode of the data write-in transistor is coupled to a corresponding second scanning line. The sixth conductive connection member includes an eleventh sub-portion and a twelfth sub-portion coupled to each other, the eleventh sub-portion extends in the second direction, the twelfth sub-portion extends in the first direction, the eleventh sub-portion is coupled to the third data line, and the twelfth sub-portion is coupled to the first electrode of the data write-in transistor. At least a part of an orthogonal projection of the eleventh sub-portion onto the base substrate is arranged between an orthogonal projection of the second scanning line onto the base substrate and an orthogonal projection of a gate electrode of the driving transistor onto the base substrate.

In a possible embodiment of the present disclosure, the fourth subpixel driving circuit in the first one of the driving circuit rows includes a driving transistor and a data write-in transistor, a second electrode of the data write-in transistor is coupled to a second electrode of the driving transistor, and the fourth data line is coupled to a first electrode of the data write-in transistor via a seventh conductive connection member. The data write-in transistor includes a data write-in active layer, and an orthogonal projection of the data write-in active layer onto the base substrate is arranged between an orthogonal projection of a third data body included in the third data line onto the base substrate and an orthogonal projection of a fourth data body included in the fourth data line onto the base substrate.

In a possible embodiment of the present disclosure, the display substrate further includes a first scanning line, the fourth subpixel driving circuit in the first one of the driving circuit rows further includes a compensation transistor, a first electrode of the compensation transistor is coupled to a first electrode of the driving transistor, a second electrode of the compensation transistor is coupled to a gate electrode of the driving transistor, and a gate electrode of the compensation transistor is coupled to a corresponding first scanning line. The seventh conductive connection member includes a thirteenth sub-portion and a fourteenth sub-portion coupled to each other, the thirteenth sub-portion is coupled to the fourth data line, the fourteenth sub-portion is coupled to the first electrode of the data write-in transistor, and an orthogonal projection of the thirteenth sub-portion onto the base substrate at least partially overlaps with an orthogonal projection of the first scanning line onto the base substrate.

In a possible embodiment of the present disclosure, the fourth subpixel driving circuit in the second one of the driving circuit rows includes a driving transistor and a data write-in transistor, a second electrode of the data write-in transistor is coupled to a second electrode of the driving transistor, and the fourth data line is coupled to a first electrode of the data write-in transistor via an eighth conductive connection member. The data write-in transistor includes a data write-in active layer, and an orthogonal projection of the data write-in active layer onto the base substrate is arranged between an orthogonal projection of a third data body included in the third data line onto the base substrate and an orthogonal projection of a fourth data body included in the fourth data line onto the base substrate.

In a possible embodiment of the present disclosure, the display substrate further includes a reference signal line and an initialization signal line, the eighth conductive connection member includes a fifteenth sub-portion and a sixteenth sub-portion coupled to each other, at least a part of the fifteenth sub-portion extends in the second direction, at least a part of the sixteenth sub-portion extends in the first direction, the fifteenth sub-portion is coupled to the fourth data line, and the sixteenth sub-portion is coupled to the first electrode of the data write-in transistor. At least a part of an orthogonal projection of the fifteenth sub-portion onto the base substrate is arranged between an orthogonal projection of the reference signal line onto the base substrate and an orthogonal projection of the initialization signal line onto the base substrate.

In a possible embodiment of the present disclosure, each of the subpixel driving circuits in the display substrate includes a driving transistor and a compensation transistor, a first electrode of the compensation transistor is coupled to a first electrode of the driving transistor, a second electrode of the compensation transistor is coupled to a gate electrode of the driving transistor via a first adaption pattern, and at least a part of an orthogonal projection of the first adaption pattern onto the base substrate is arranged between an orthogonal projection of the second data line onto the base substrate and an orthogonal projection of the third data line onto the base substrate.

In a possible embodiment of the present disclosure, the first adaption pattern includes a first end, a second end and a connection member coupled to the first end and the second end, the first end is coupled to the gate electrode of the driving transistor, the second end is coupled to the second electrode of the compensation transistor, and the connection member extends in the second direction.

In a possible embodiment of the present disclosure, in a layout region of the first one of the driving circuit rows, an orthogonal projection of the first adaption pattern in a layout region of the second subpixel driving circuit onto the base substrate and an orthogonal projection of the first adaption pattern in a layout region of the third subpixel driving circuit onto the base substrate are both arranged between the orthogonal projection of the second data line onto the base substrate and the orthogonal projection of the third data line onto the base substrate, an orthogonal projection of the first end in a layout region of the first subpixel driving circuit onto the base substrate at least partially overlaps with the orthogonal projection of the second data line onto the base substrate, and an orthogonal projection of the first end in a layout region of the fourth subpixel driving circuit onto the base substrate at least partially overlaps with the orthogonal projection of the third data line onto the base substrate.

In a possible embodiment of the present disclosure, in a layout region of the second one of the driving circuit rows, an orthogonal projection of the first adaption pattern in a layout region of the first subpixel driving circuit onto the base substrate and an orthogonal projection of the first adaption pattern in a layout region of the third subpixel driving circuit onto the base substrate are both arranged between the orthogonal projection of the second data line onto the base substrate and the orthogonal projection of the third data line onto the base substrate, an orthogonal projection of the first end in a layout region of the second subpixel driving circuit onto the base substrate at least partially overlaps with the orthogonal projection of the second data line onto the base substrate, and an orthogonal projection of the first end in a layout region of the fourth subpixel driving circuit onto the base substrate at least partially overlaps with the orthogonal projection of the third data line onto the base substrate.

In a possible embodiment of the present disclosure, the display substrate further includes a power source layer, and an orthogonal projection of the power source layer onto the base substrate covers the orthogonal projection of the first adaption pattern onto the base substrate.

In a possible embodiment of the present disclosure, the power source layer includes a plurality of first power source lines and a plurality of second power source lines, each of the first power source lines cross the second power source lines, and the first power source line is coupled to the second power source lines. An orthogonal projection of the first power source line onto the base substrate covers an orthogonal projection of the first end onto the base substrate, and/or the orthogonal projection of the first power source line onto the base substrate at least partially overlaps with an orthogonal projection of the connection member onto the base substrate. An orthogonal projection of the second power source line onto the base substrate covers an orthogonal projection of the second end onto the base substrate, and/or the orthogonal projection of the second power source line onto the base substrate at least partially overlaps with the orthogonal projection of the connection member onto the base substrate.

In a possible embodiment of the present disclosure, the display substrate includes a plurality of first sensing aperture regions and a plurality of second sensing aperture regions, each of the first sensing aperture regions is arranged between a layout region of the second subpixel driving circuit and a layout region of the third subpixel driving circuit in a corresponding first one of the driving circuit rows, and each of the second sensing aperture regions is arranged between a layout region of the first subpixel driving circuit and a layout region of the third subpixel driving circuit in a corresponding second one of the driving circuit rows.

In another aspect, the present disclosure provides in some embodiments a display device including the above-mentioned display substrate.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. In these drawings.

Figure 4:
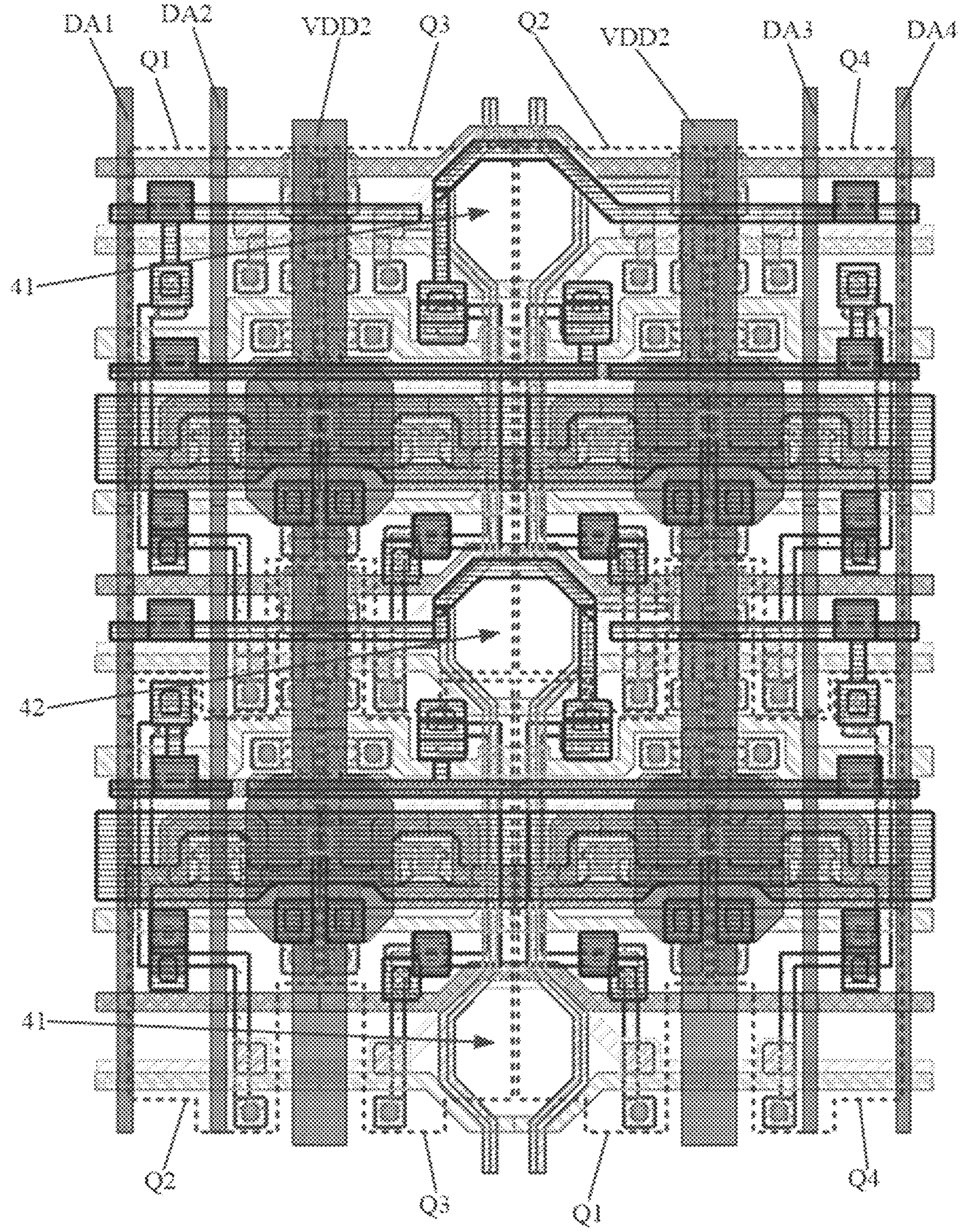
FIG. 4 is a schematic view showing the layout of a column unit according to one embodiment of the present disclosure.
Figure 7:
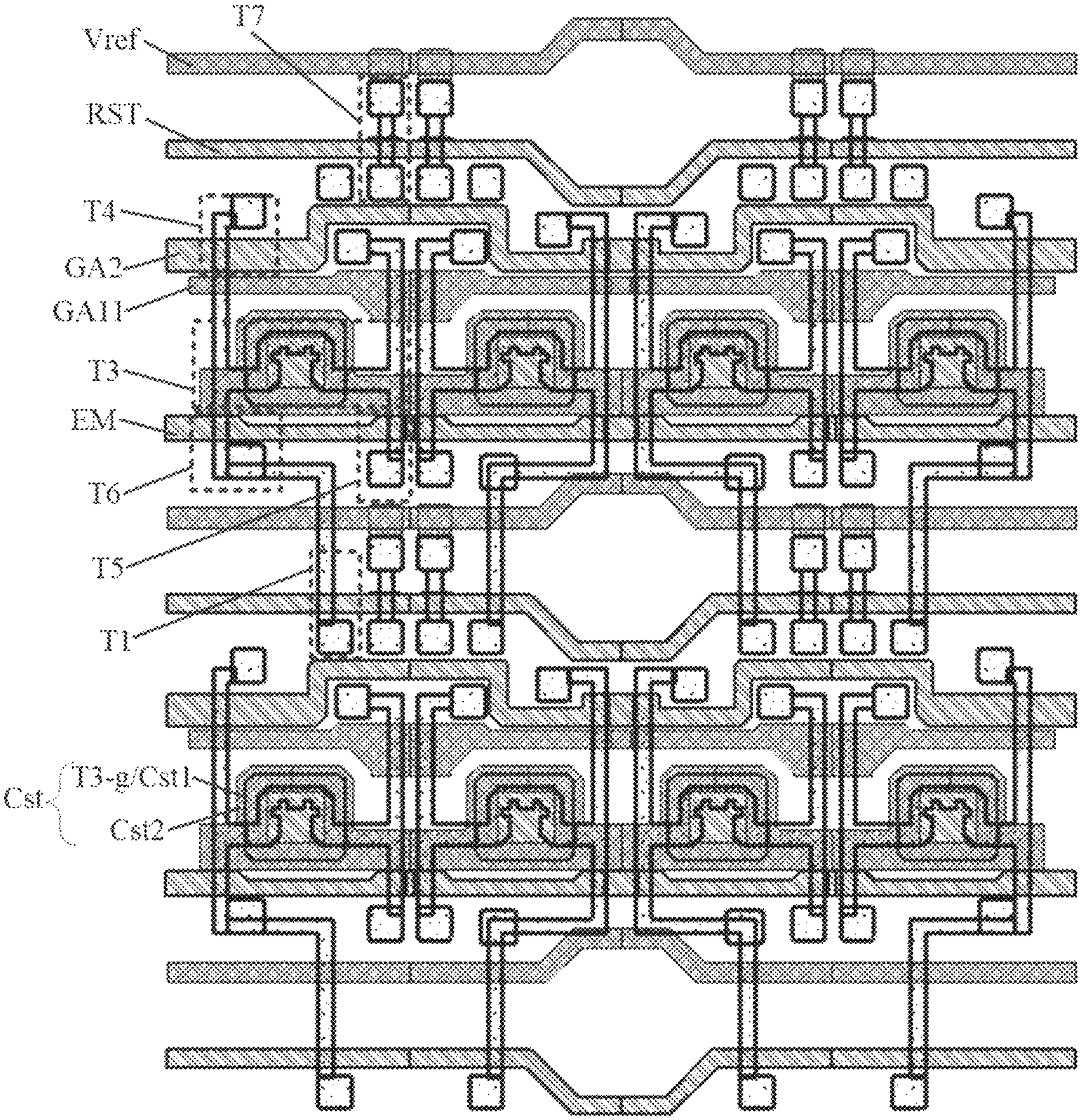
FIG. 7 is a schematic view showing the layout of a second gate metal layer added on the basis of FIG. 6.
Figure 8:
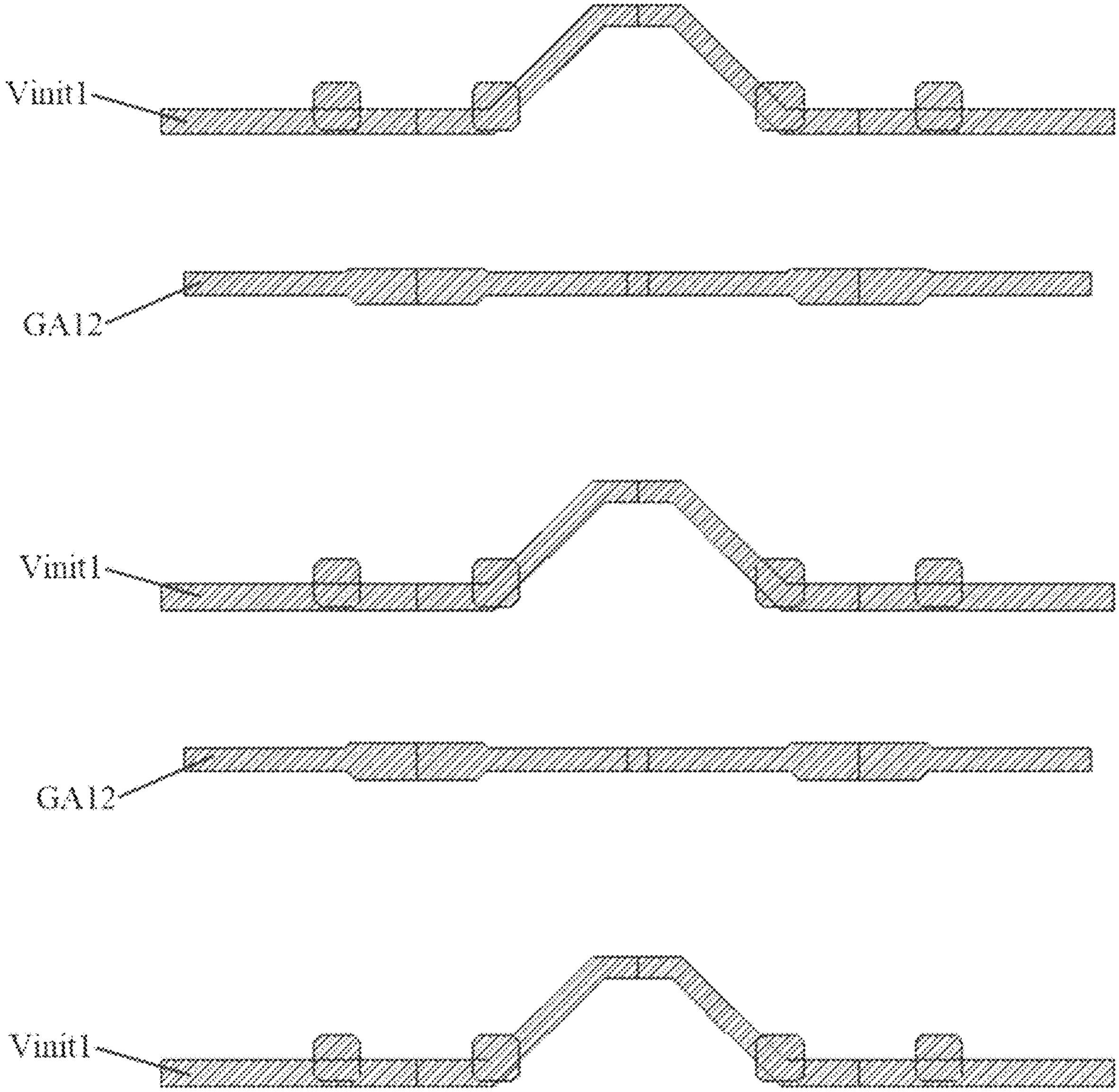
FIG. 8 is a schematic view showing the layout of a third gate metal layer in FIG. 4.
Figure 10:
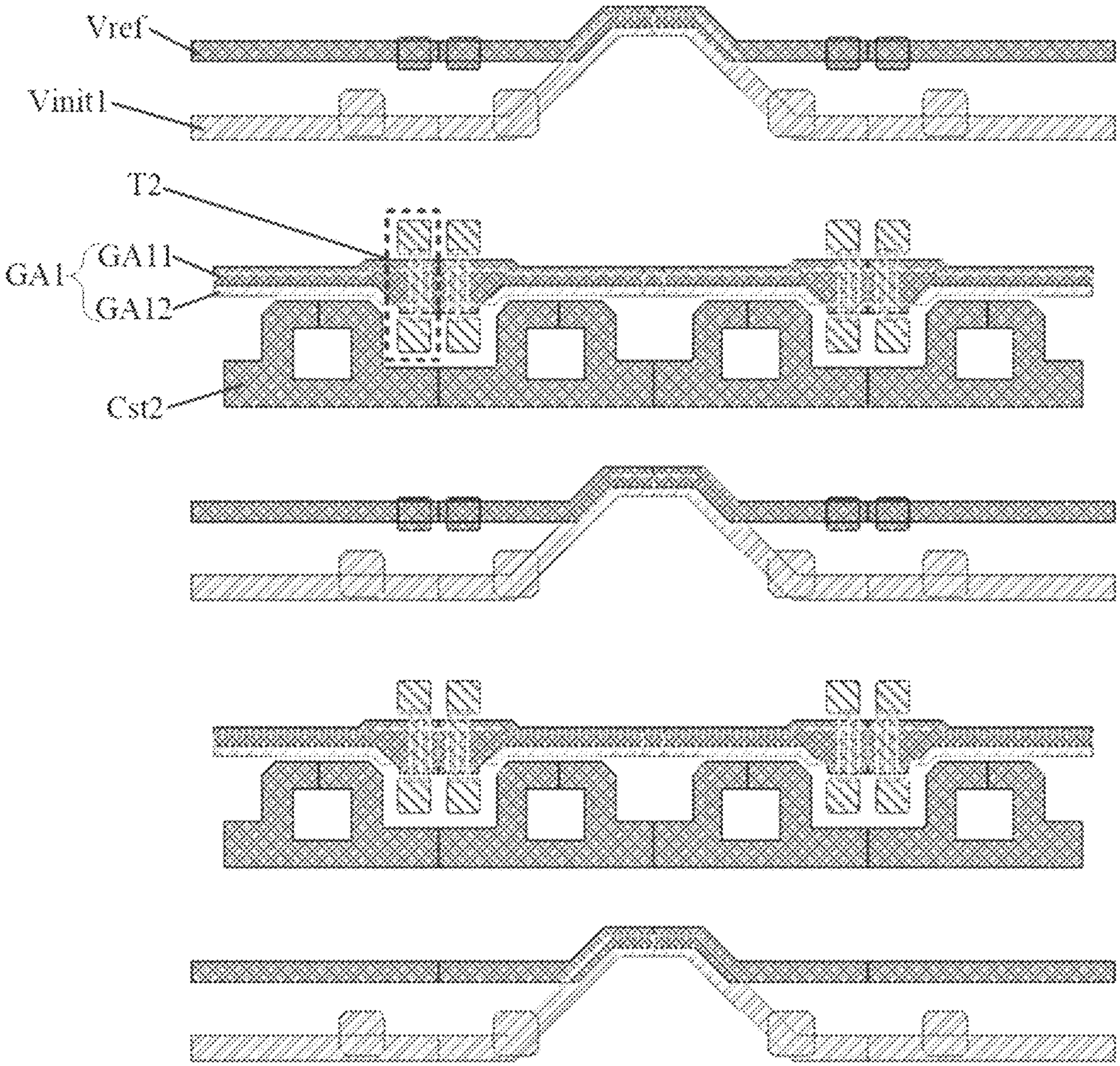
FIG. 10 is a schematic view showing the layout of the second gate metal layer, the oxide active layer and a third gate metal layer in FIG. 4.
Figure 11:
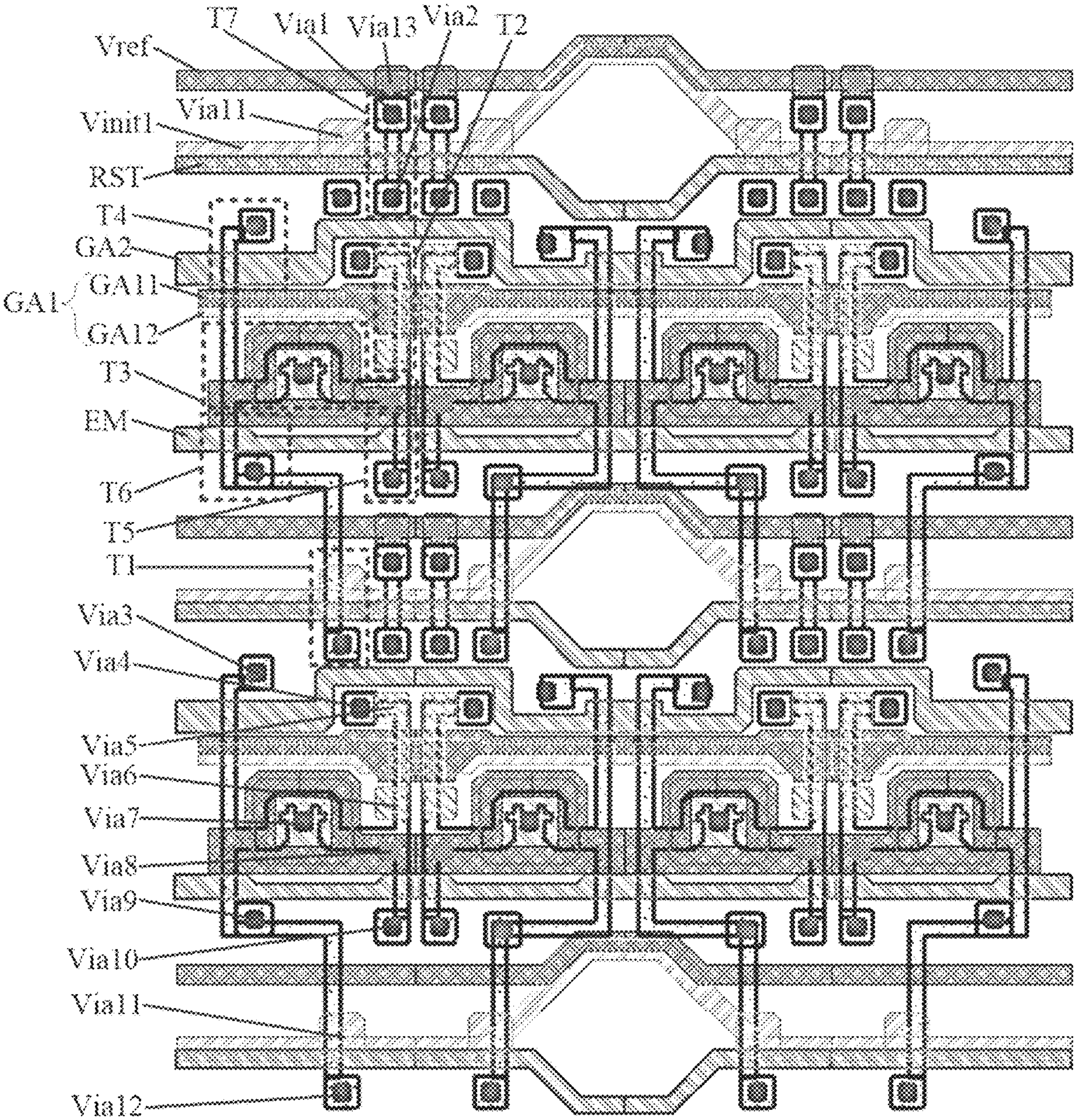
Figure 12:
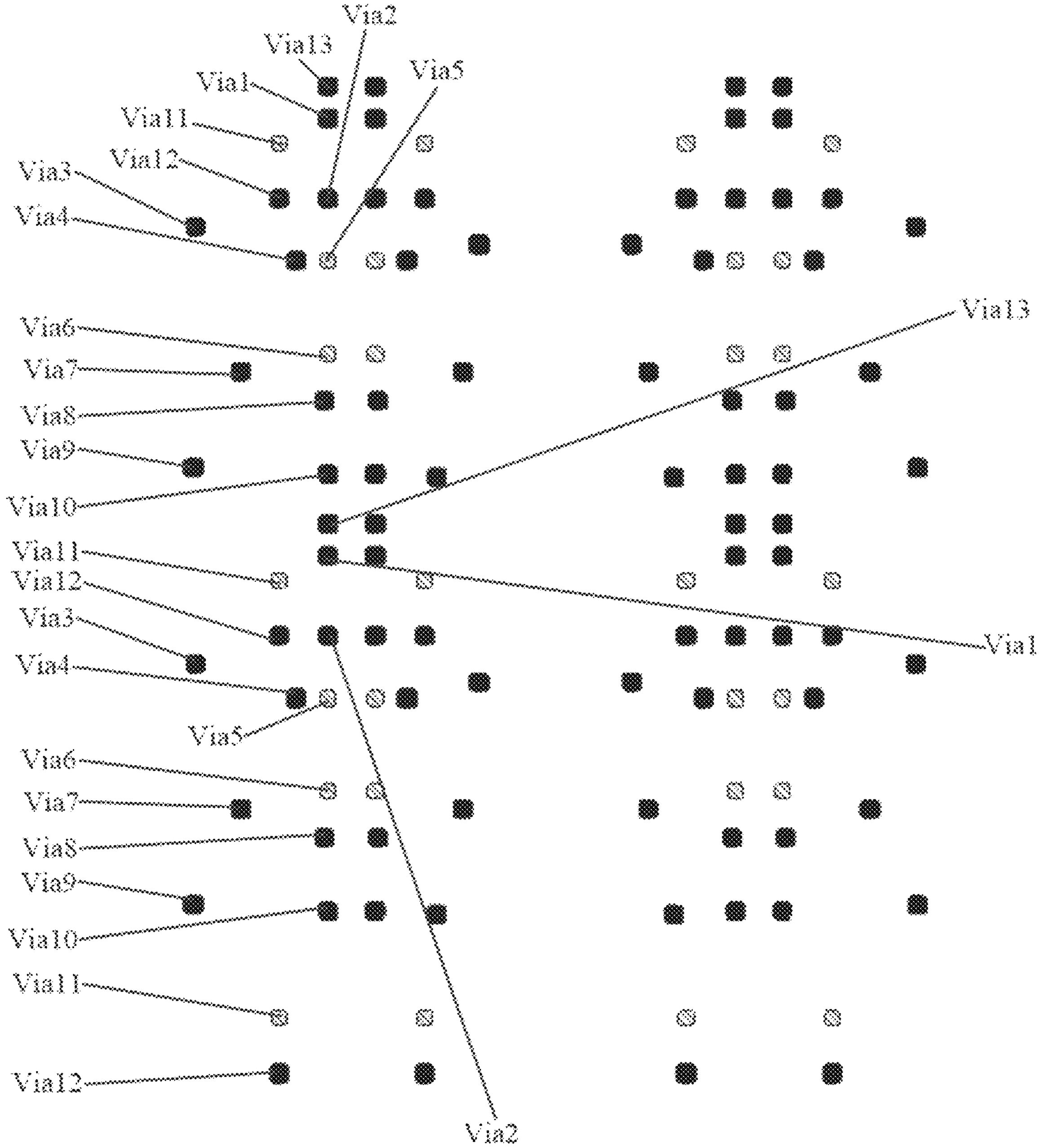
Figure 13:
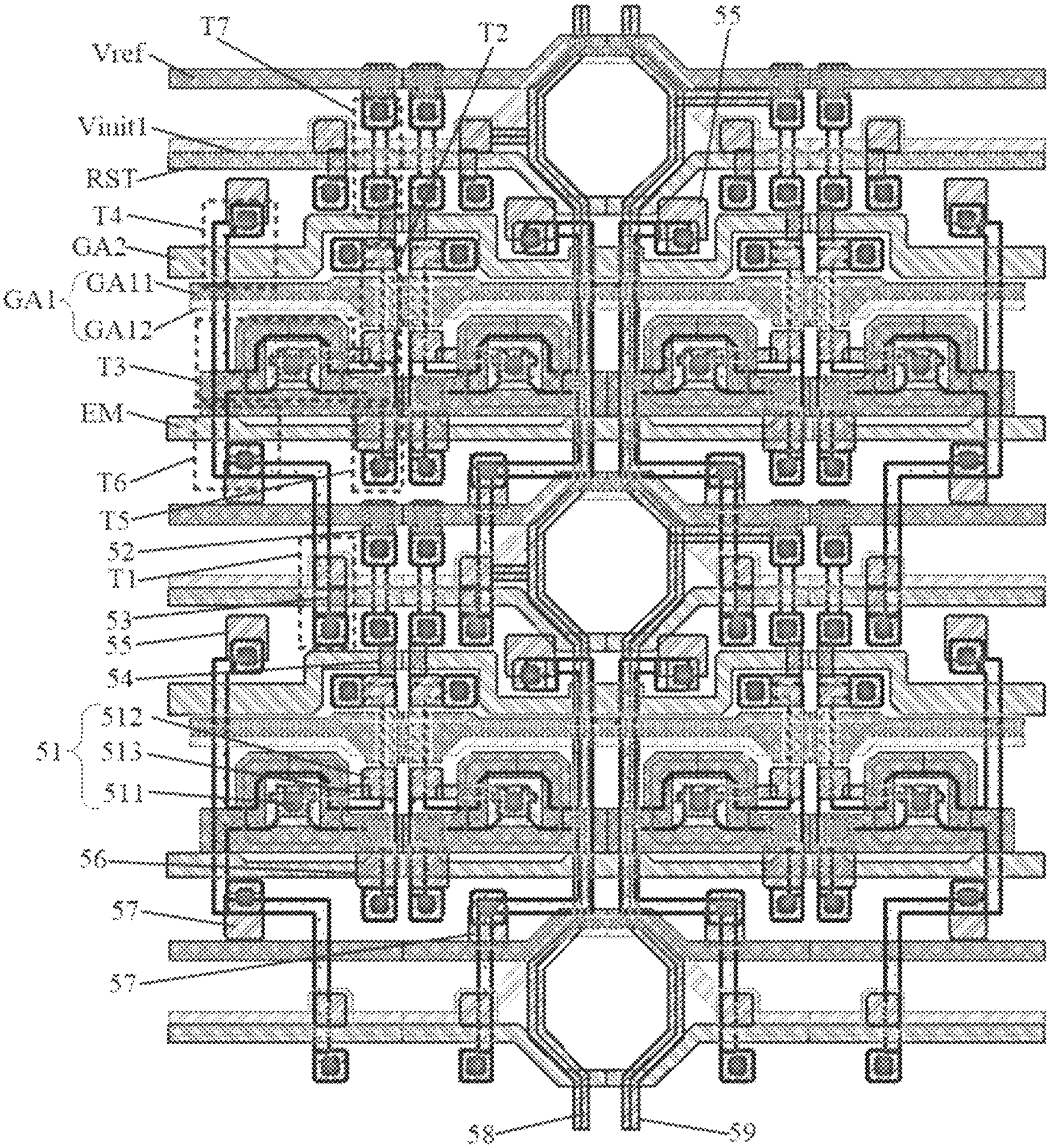
Figure 14:
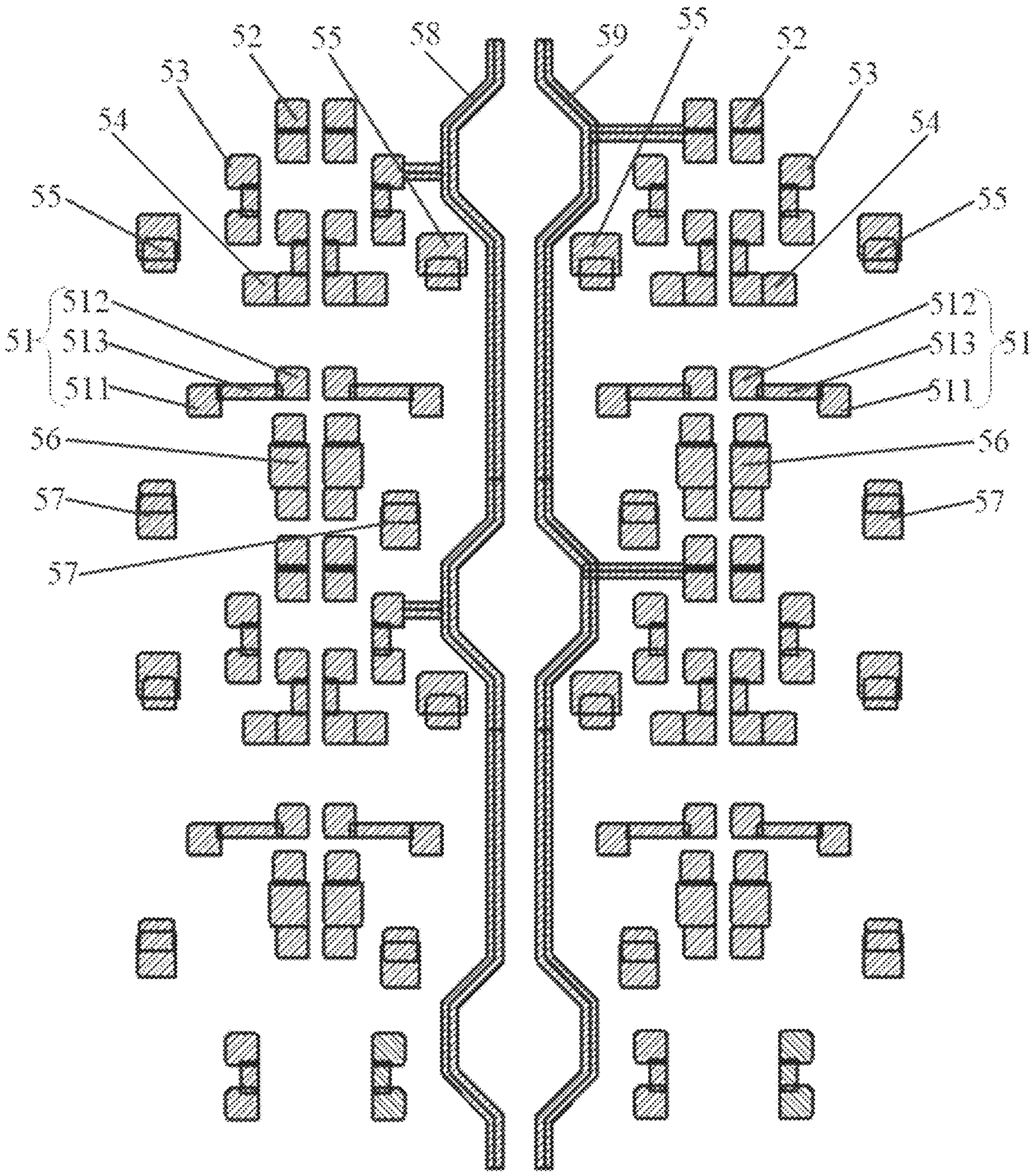
Figure 15:
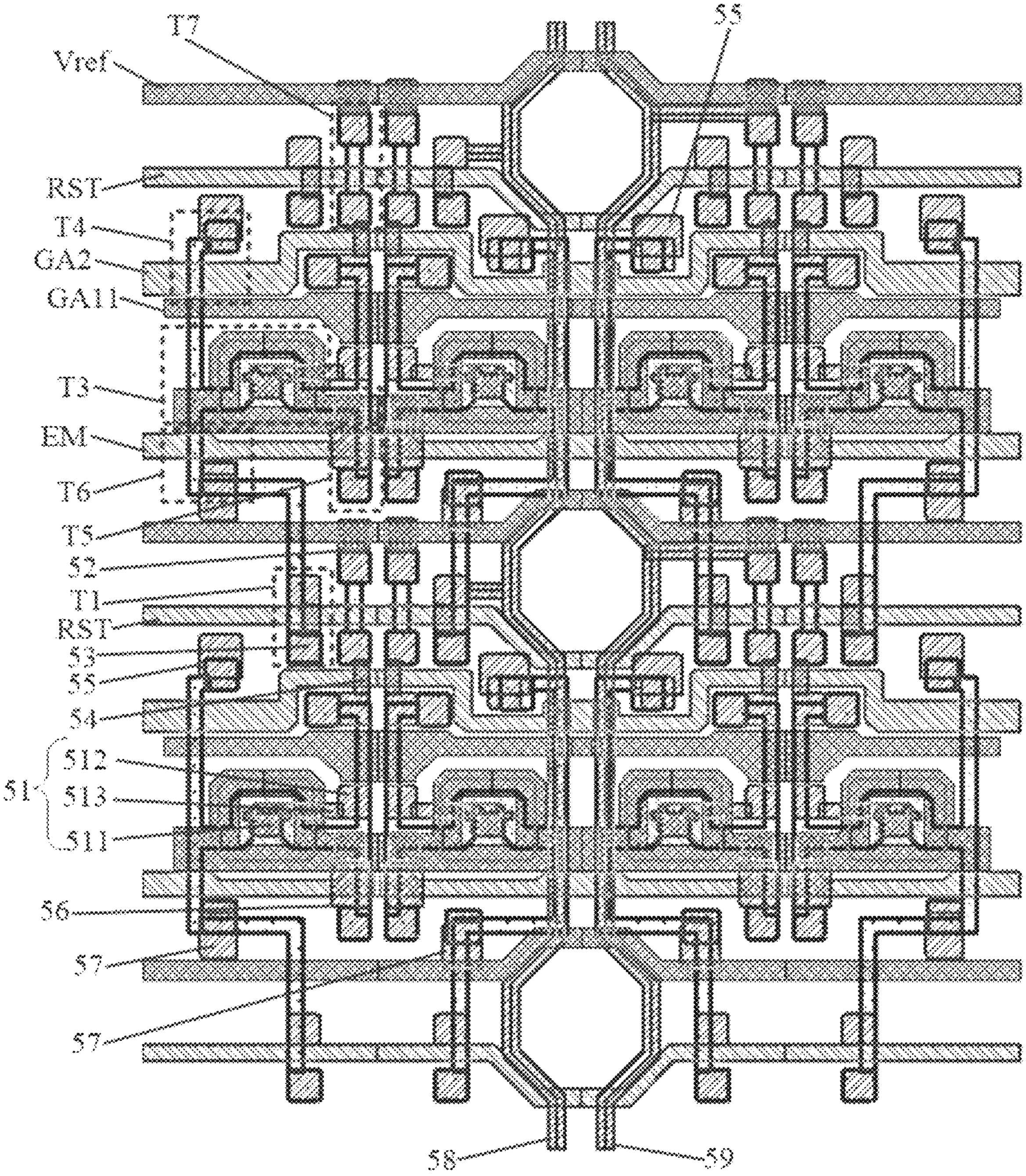
Figure 16:
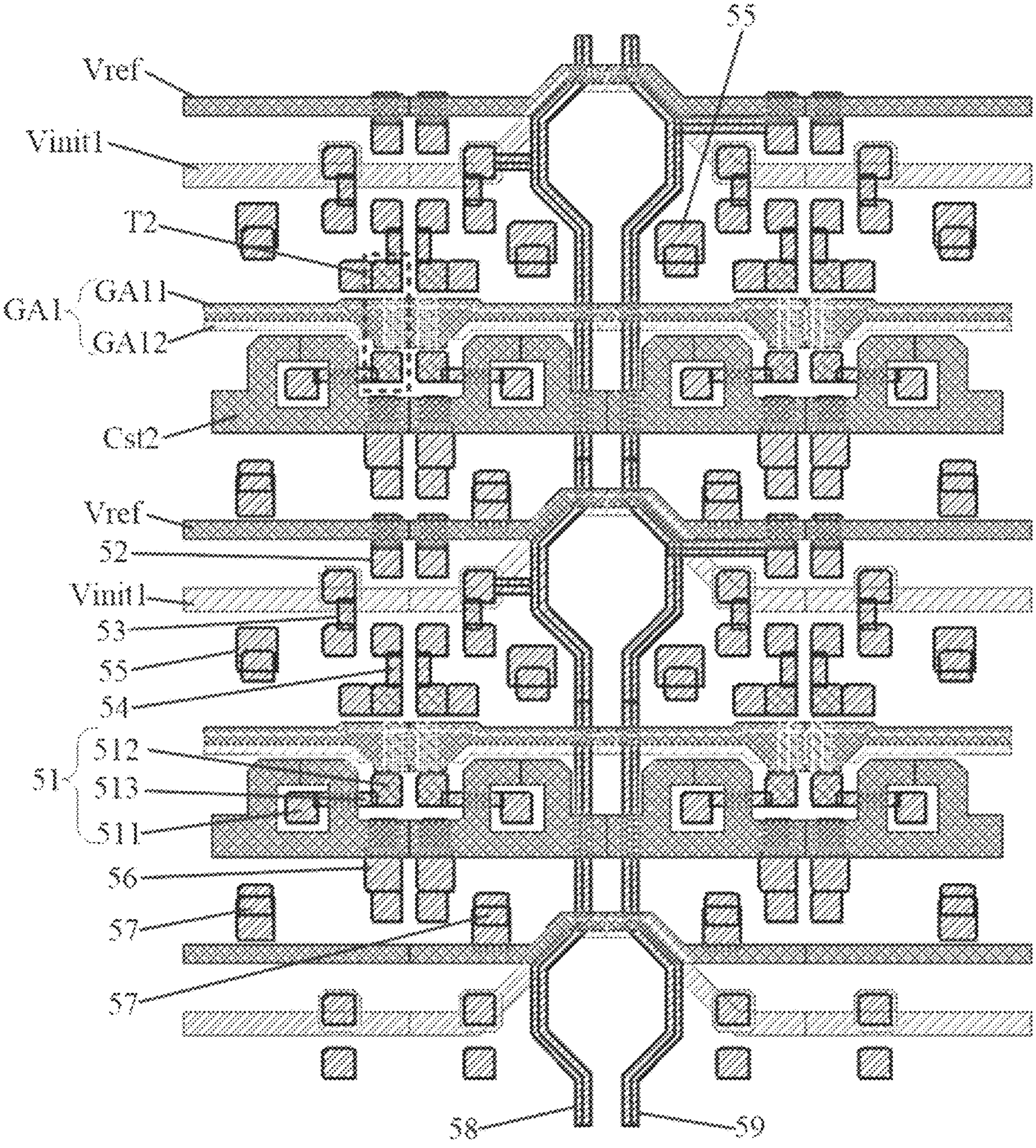
Figure 17:
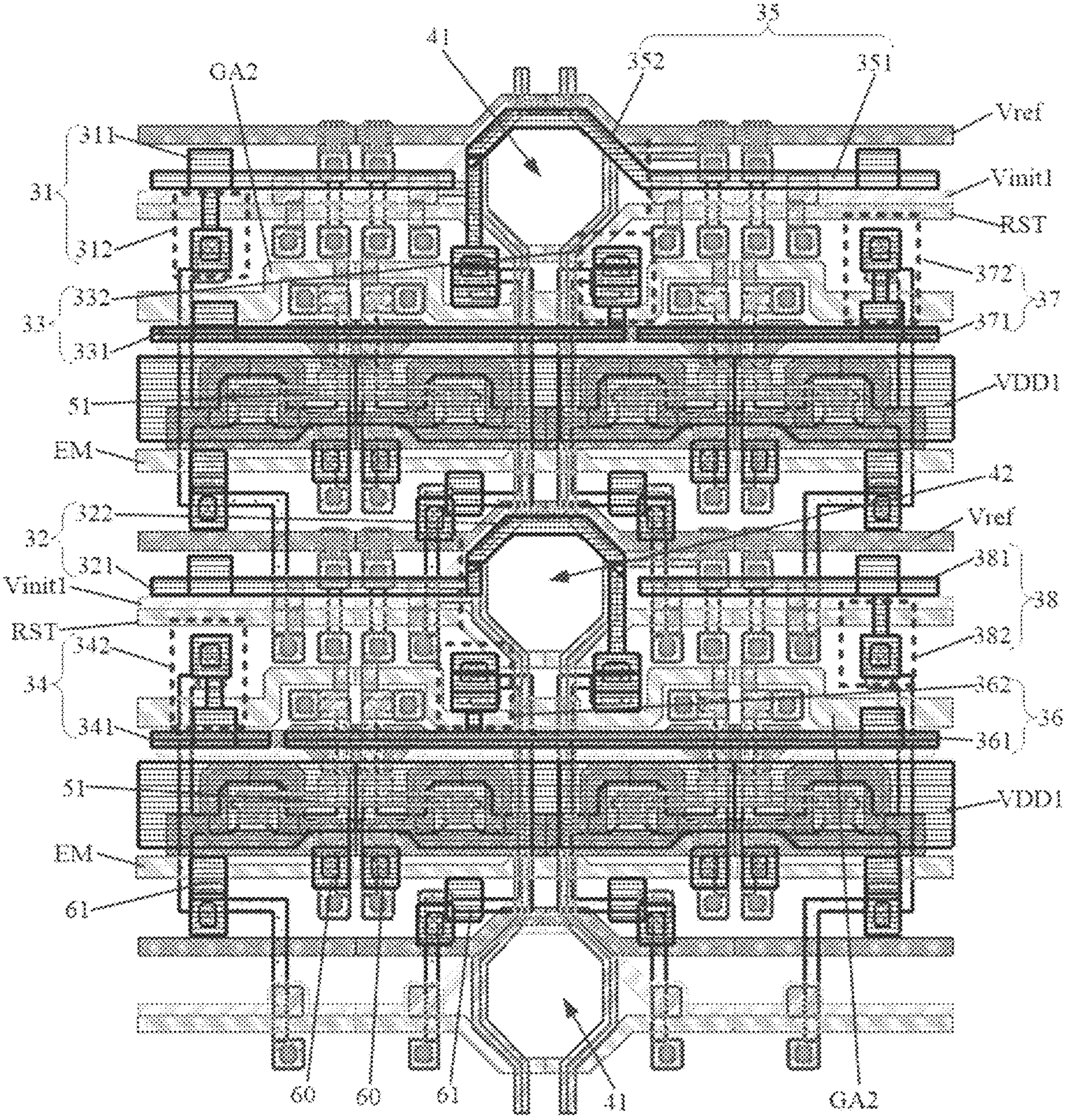
Figure 18:
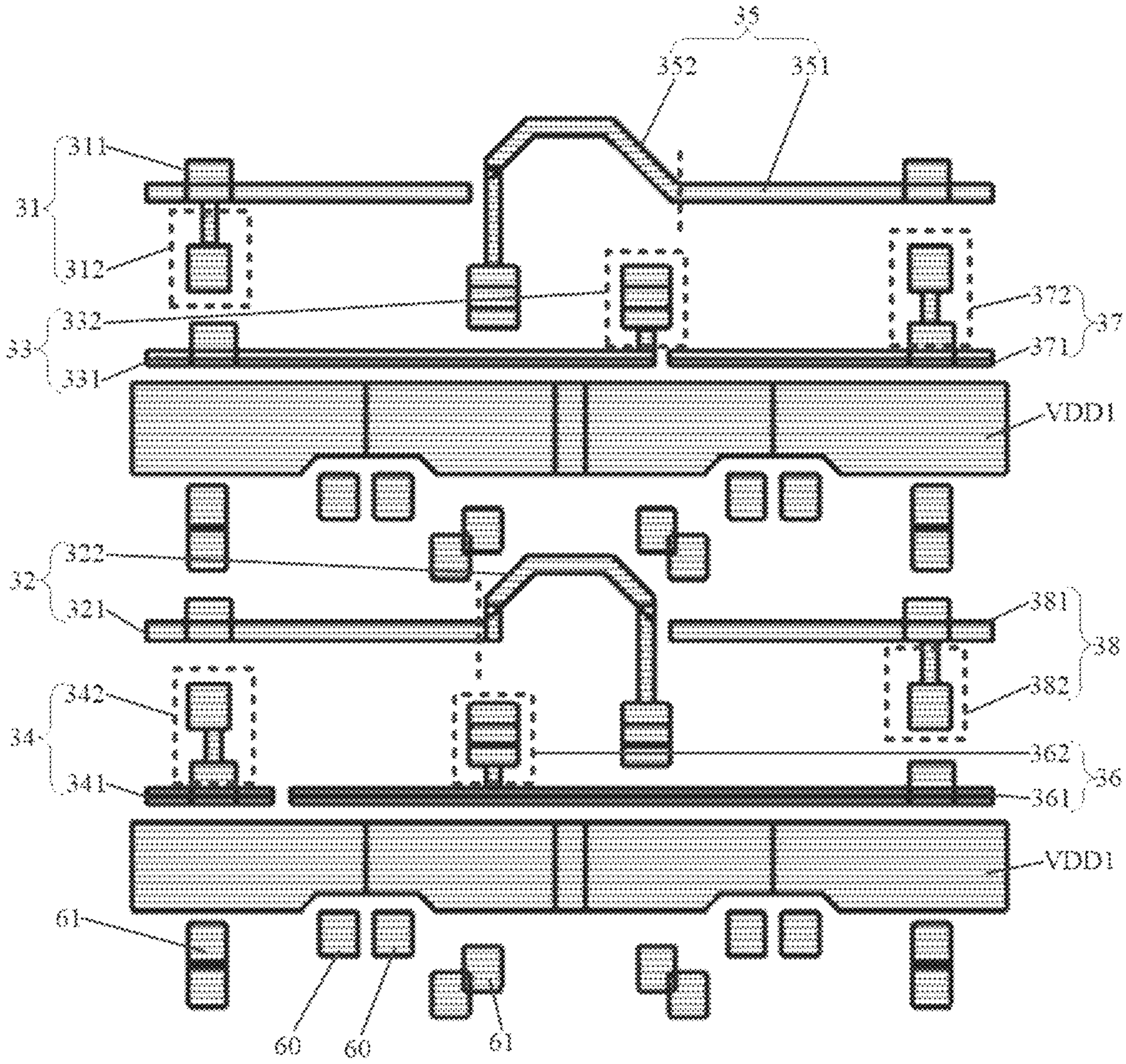
Figure 19:
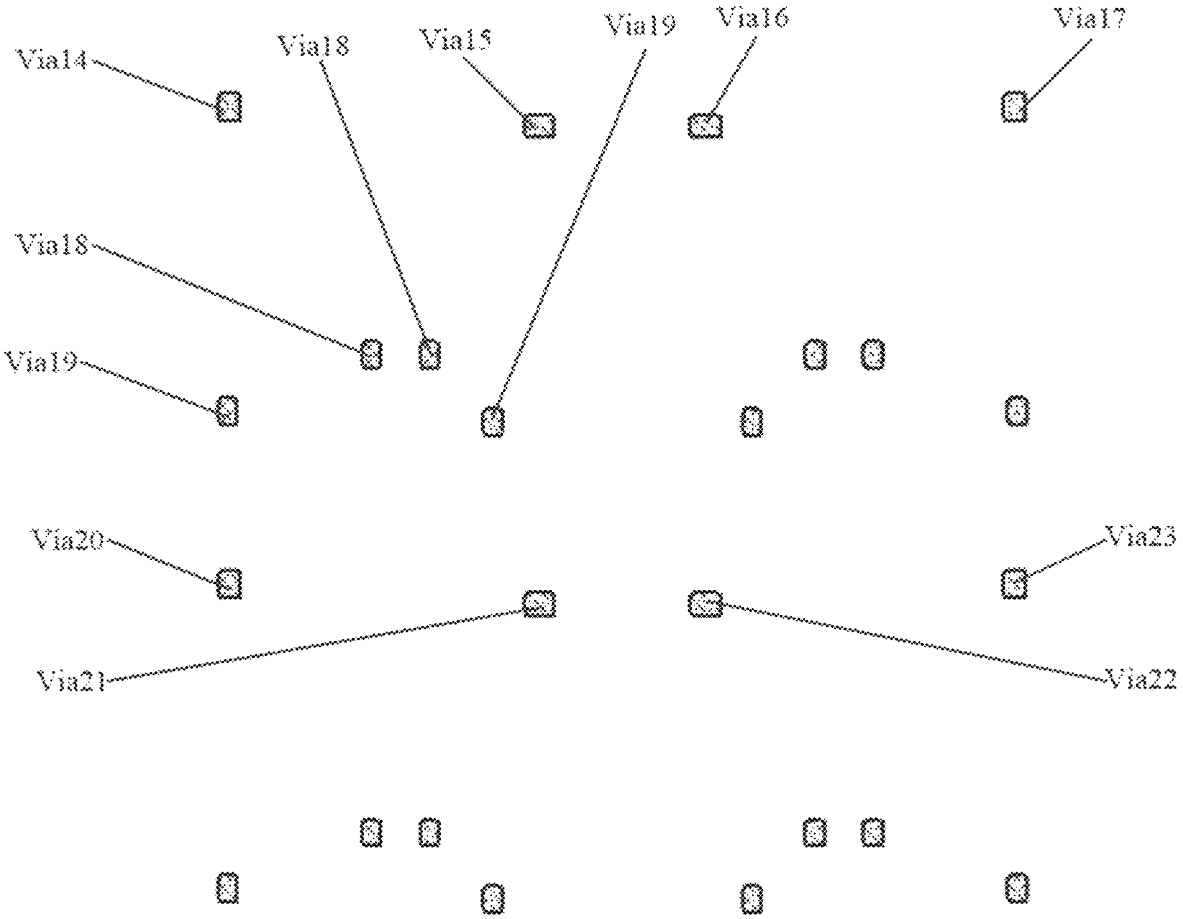
Figure 20:
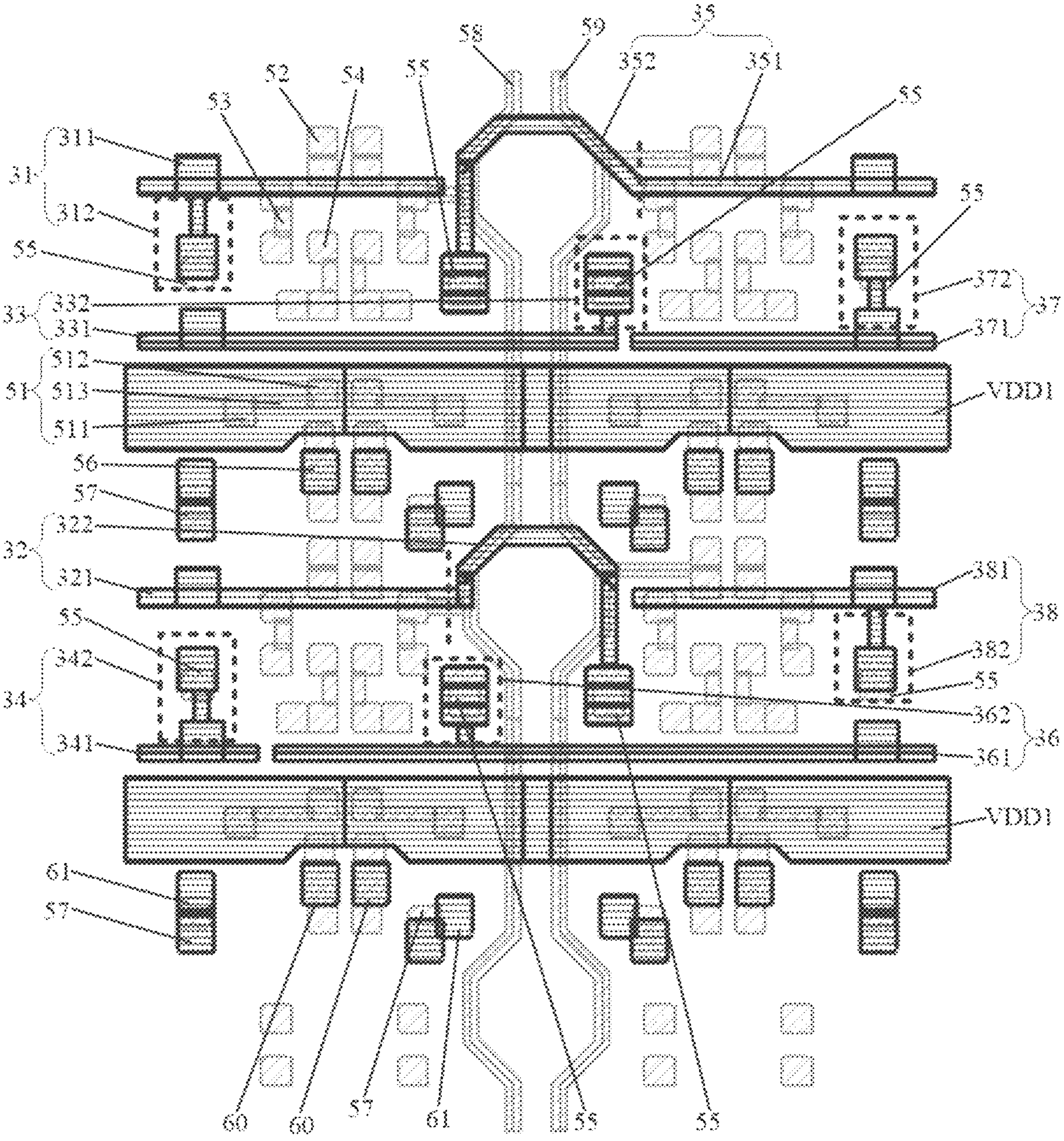
Figure 21:
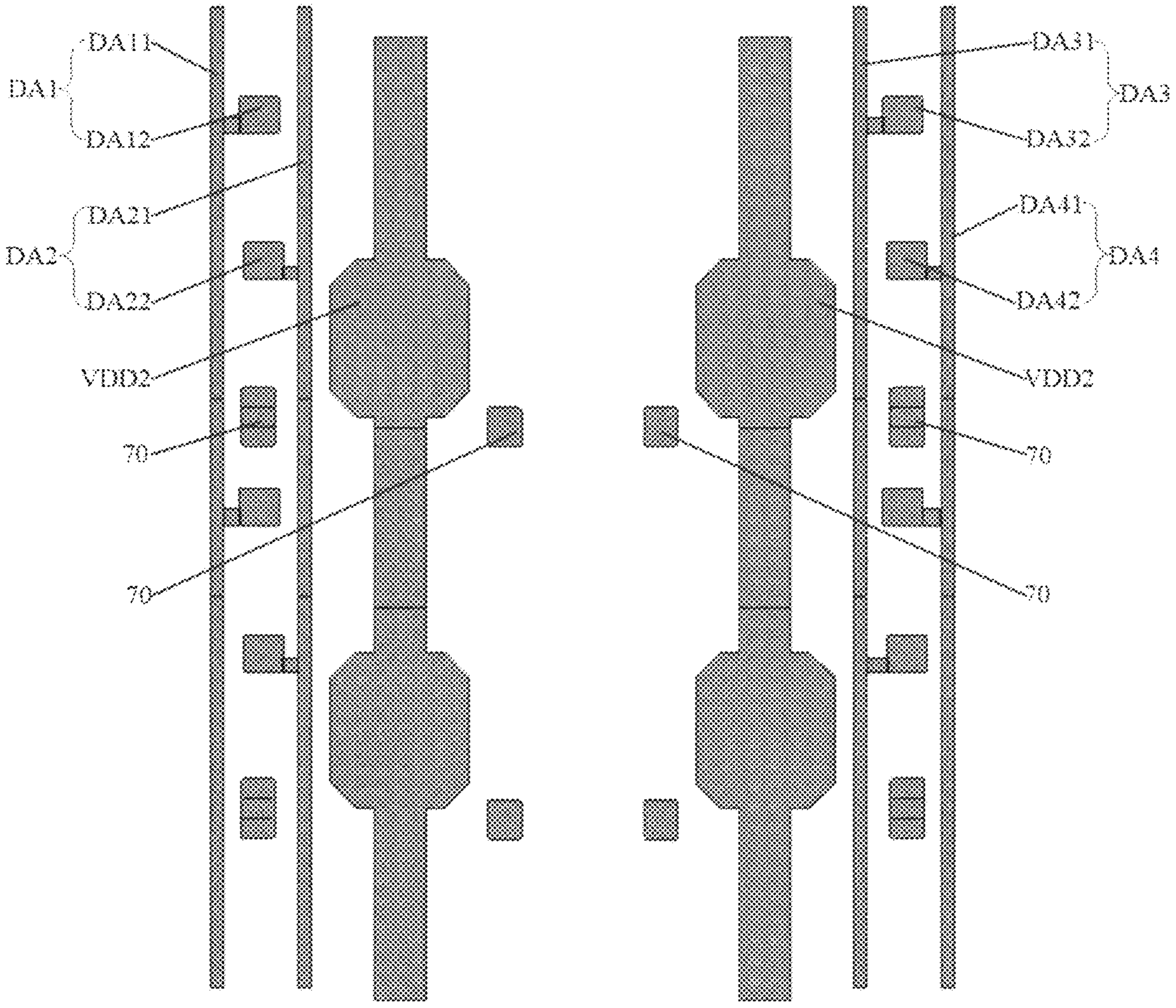
Figure 22:
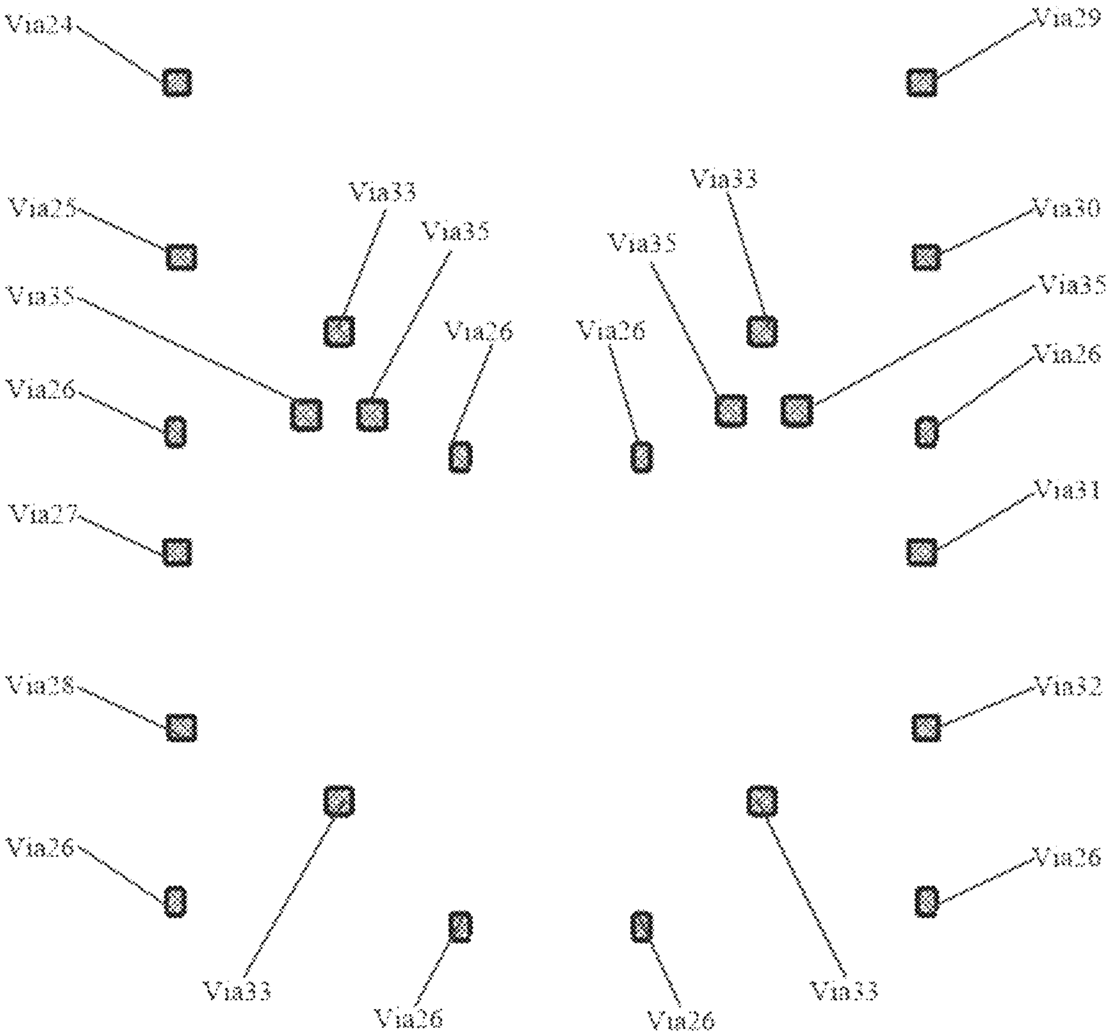
Figure 23:
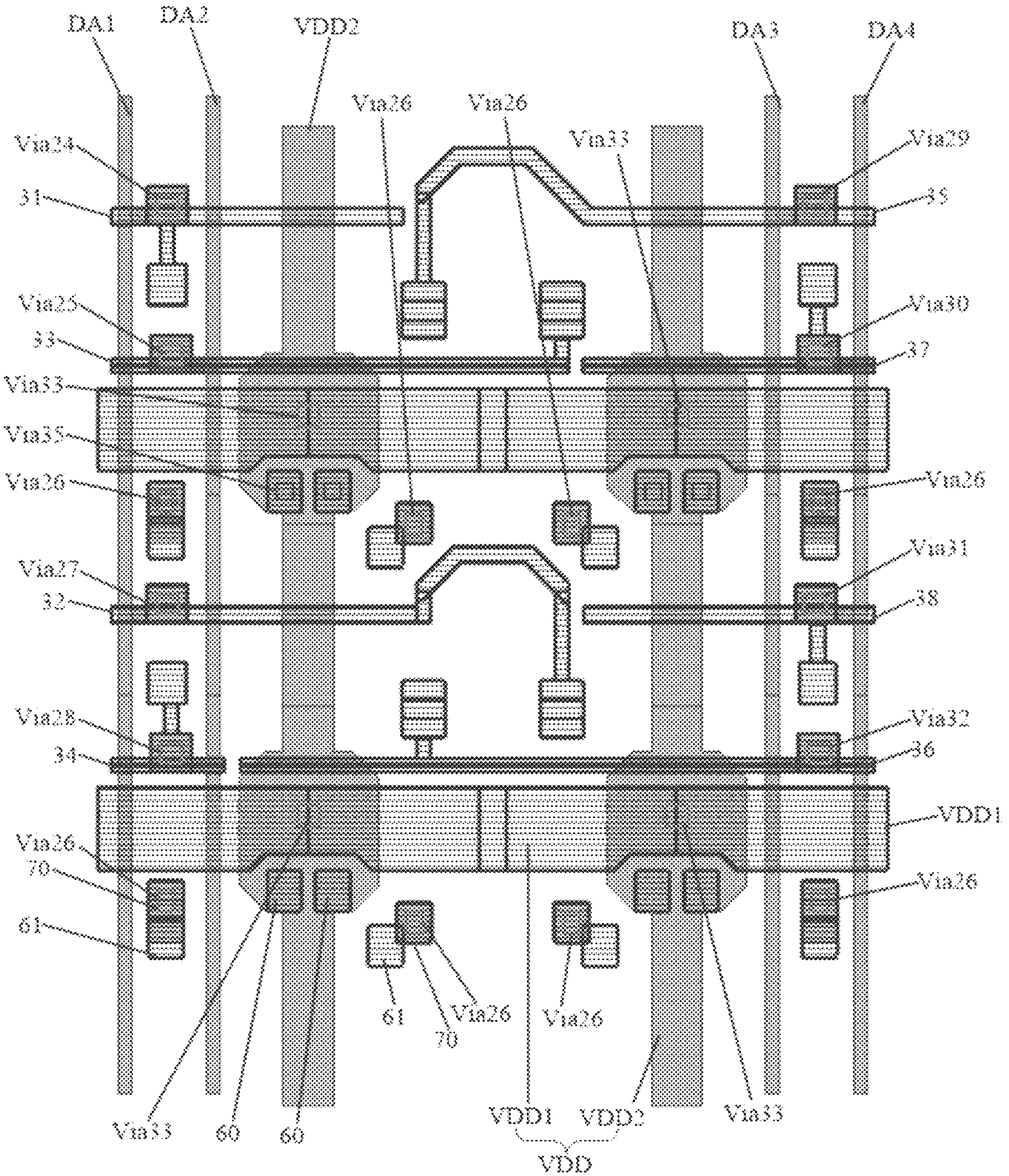
Figure 24:
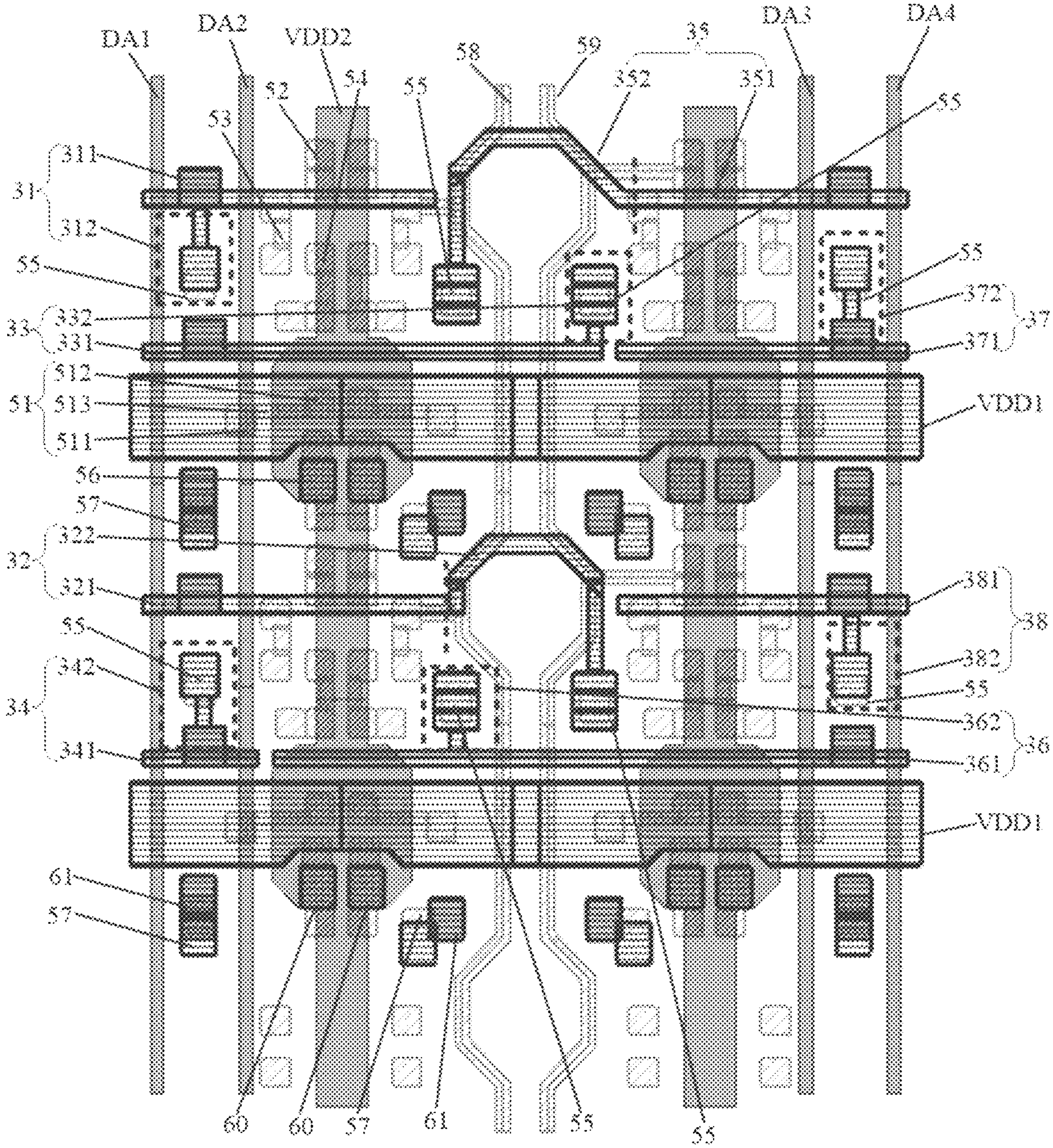
Figure 25:
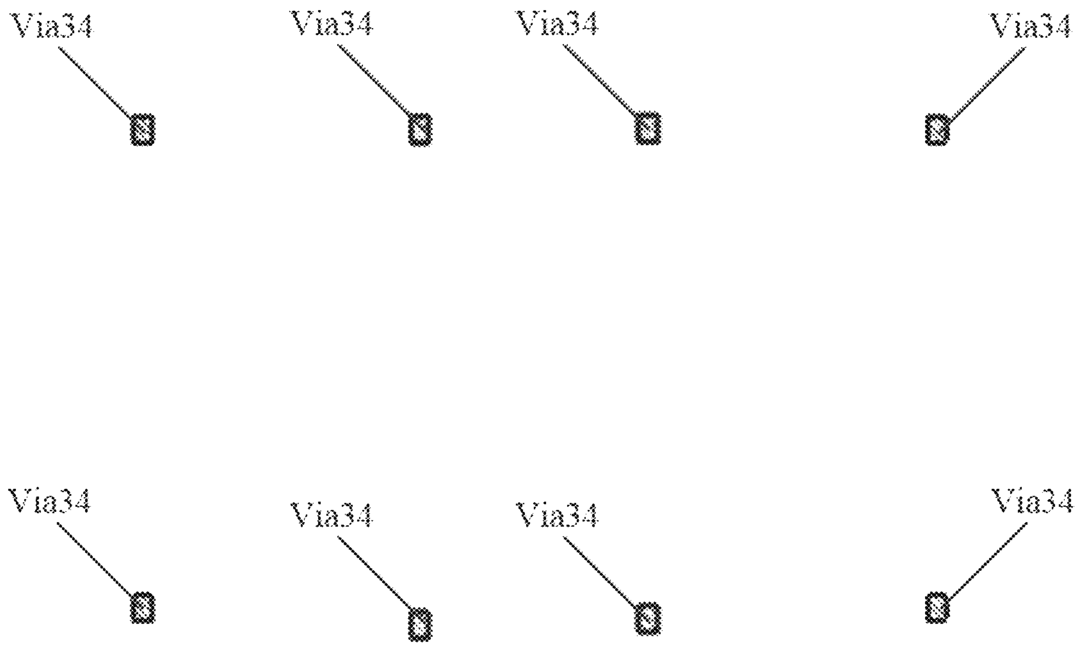
Figure 26:
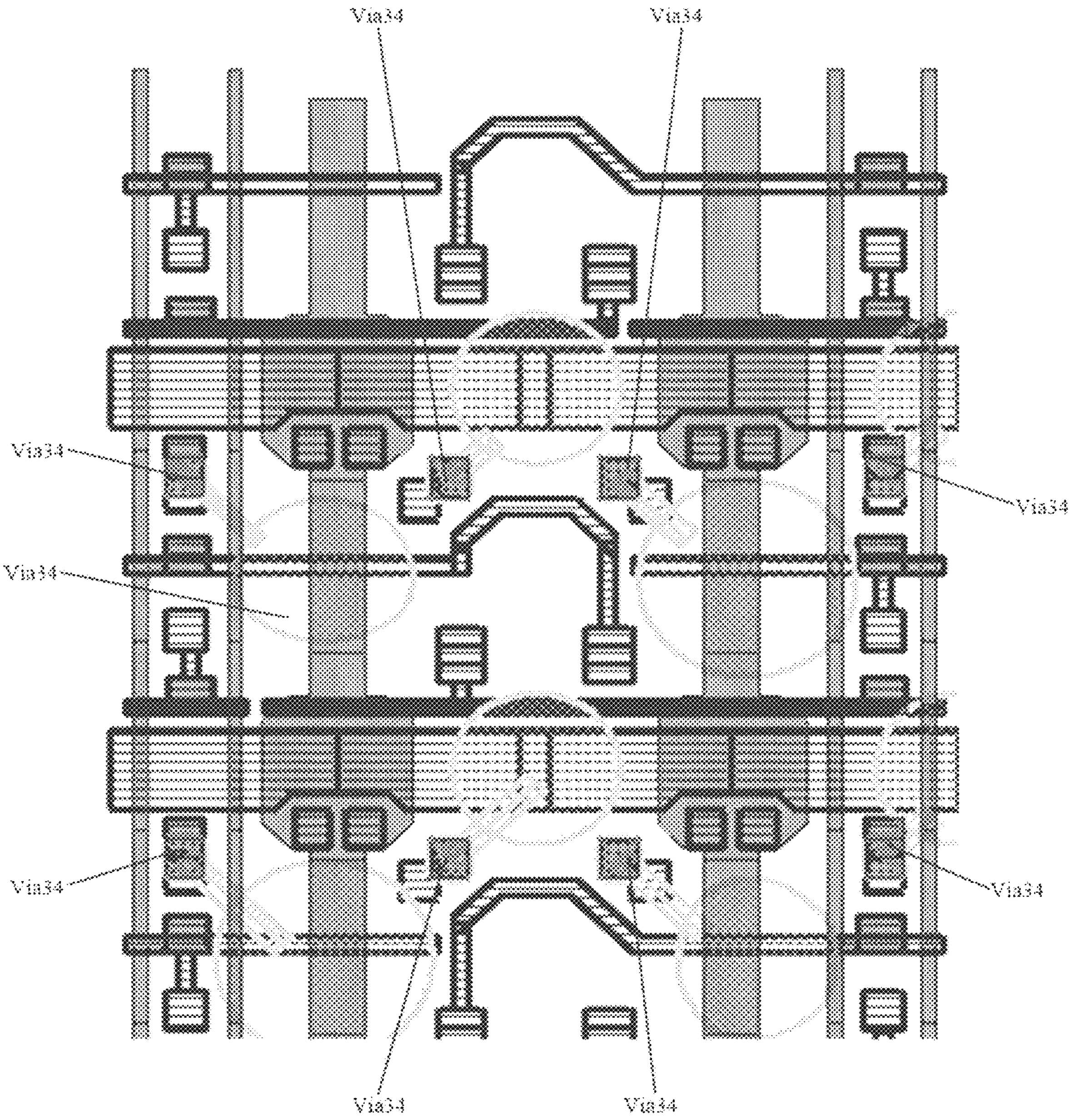
Figure 27:
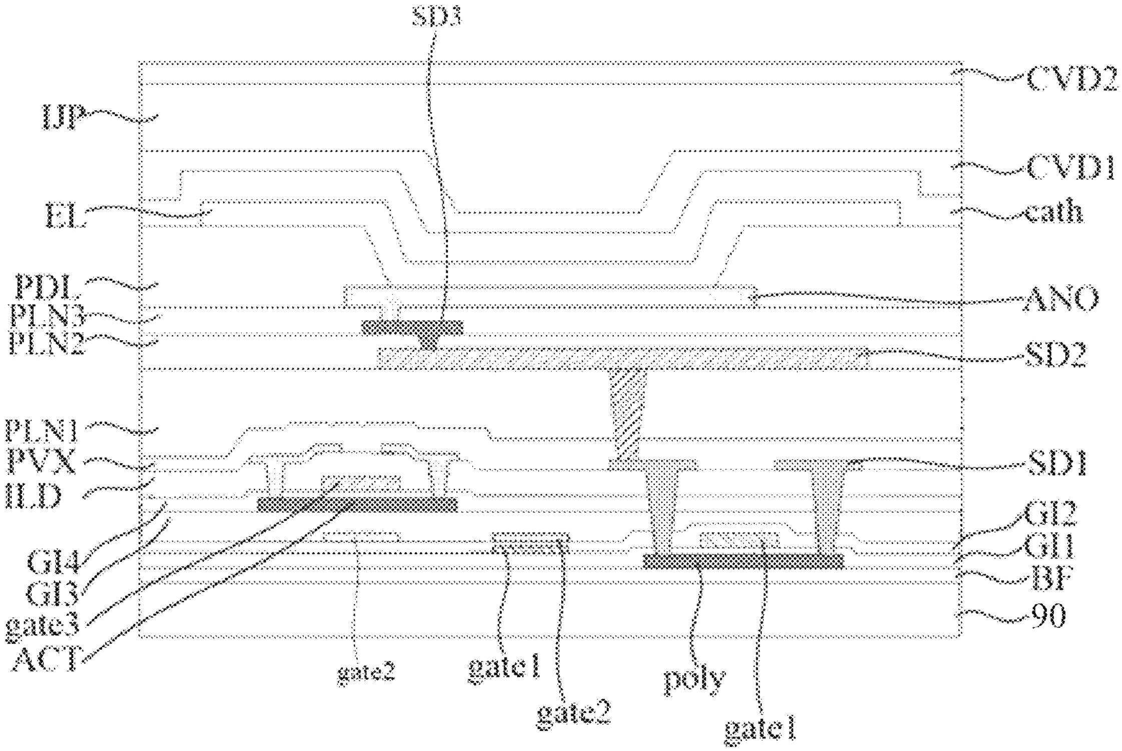

Fig. II is a schematic view showing the layout of the oxide active layer and the third gate metal layer added on the basis of FIG. 7;

FIG. 12 is a schematic view showing via-holes formed in an interlayer insulation layer;

FIG. 13 is a schematic view showing the layout of a first source/drain metal layer added on the basis of FIG. 11;

FIG. 14 is a schematic view showing the layout of the first source/drain metal layer added on the basis of FIG. 13;

FIG. 15 is a schematic view showing the layout of the first source/drain metal layer added on the basis of FIG. 7;

FIG. 16 is a schematic view showing the layout of the first source/drain metal layer on the basis of FIG. 10;

FIG. 17 is a schematic view showing the layout of a second source/drain metal layer added on the basis of FIG. 13;

FIG. 18 is a schematic view showing the layout of the second source/drain metal layer added on the basis of FIG. 17;

FIG. 19 is a schematic view showing via-holes formed in a first planarization layer in FIG. 17;

FIG. 20 is a schematic view showing the layout of the first source/drain metal layer and the second source/drain metal layer in FIG. 4;

FIG. 21 is a schematic view showing the layout of a third source/drain metal layer in FIG. 4;

FIG. 22 is a schematic view showing via-holes formed in a second planarization layer in FIG. 4;

FIG. 23 is a schematic view showing the layout of the second source/drain metal layer and the third source/drain metal layer in FIG. 4;

FIG. 24 is a schematic view showing the layout of the first source/drain metal layer, the second source/drain metal layer and the third source/drain metal layer in FIG. 4;

FIG. 25 is a schematic view showing via-boles formed in a third planarization layer in FIG. 4;

FIG. 26 is a schematic view showing the layout of the second source/drain metal layer, the third source/drain metal layer and an anode layer in the column unit according to one embodiment of the present disclosure; and FIG. 27 is a sectional view of a display substrate according to one embodiment of the present disclosure.

DETAILED DESCRIPTION

The present disclosure will be described hereinafter in conjunction with the drawings and embodiments.

Figure 1:
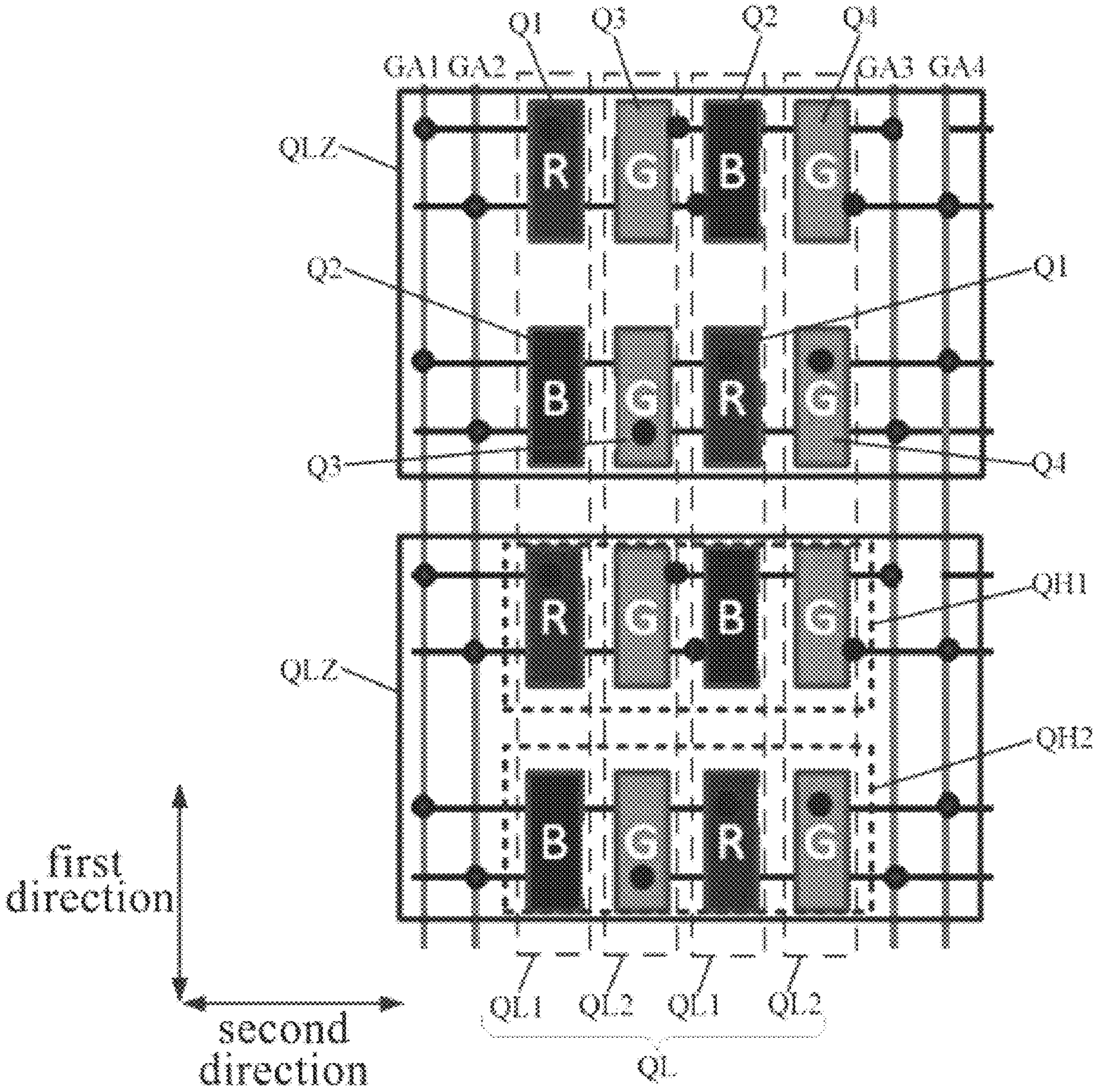
FIG. 1 is a schematic view showing column units and data lines according to one embodiment of the present disclosure.
Figure 2:
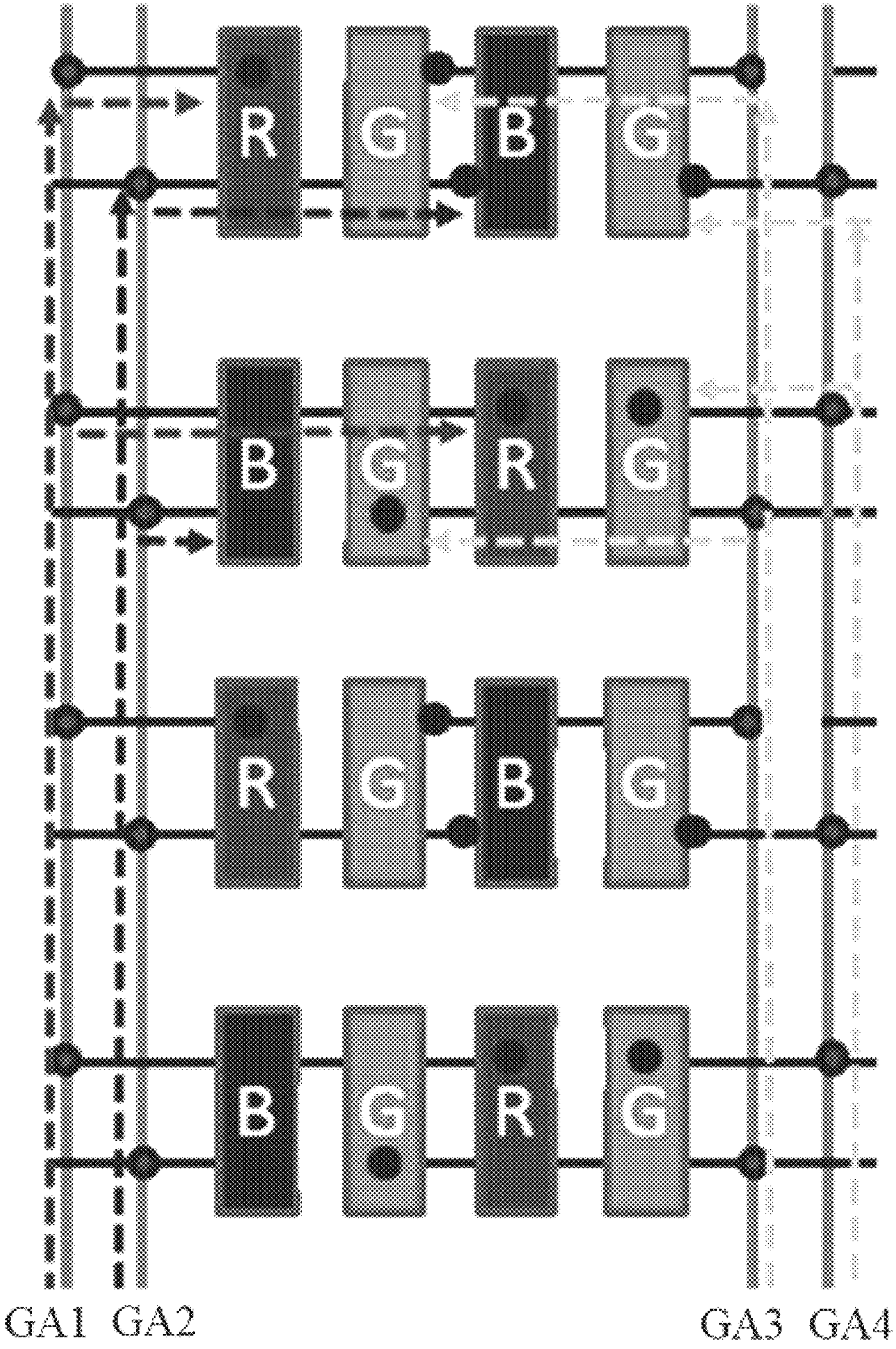
FIG. 2 is a schematic view showing a signal path of a data signal transmitted by a data line according to one embodiment of the present disclosure.

Referring to FIGS. 1 and 2, the present disclosure provides in some embodiments a display substrate, which includes a base substrate, and a plurality of subpixels and a plurality of data lines (e.g., a first data line DA1, a second data line DA2, a third data line DA3 and a fourth data line DA4) arranged on the base substrate. Each of the subpixels includes a subpixel driving circuit (e.g., a first subpixel driving circuit Q1, a second subpixel driving circuit Q2, a third subpixel driving circuit Q3 or a fourth subpixel driving circuit Q4) and a light-emitting element coupled to each other.

A plurality of subpixel driving circuits included in the plurality of subpixels includes a plurality of driving circuit columns (e.g., a first driving circuit column QL1 and a second driving circuit column QL2), each of the driving circuit columns includes a plurality of subpixel driving circuits arranged in a first direction, the plurality of driving circuit columns includes a plurality of column units QL, each of the column units QL includes at least two driving circuit columns proximate to each other, the data lines coupled to the subpixel driving circuits included in the column unit QL are located at a first side and/or a second side of the column unit QL, the first side is opposite to the second side in a second direction, and the second direction intersects the first direction.

For example, the display substrate includes a plurality of subpixels, and the plurality of subpixel driving circuits included in the plurality of subpixels is arranged in an array form. The plurality of subpixel driving circuits includes a plurality of driving circuit rows and a plurality of driving circuit columns. The plurality of driving circuit rows is arranged in the first direction, and the subpixel driving circuit row includes a plurality of subpixel driving circuits arranged in the second direction. The plurality of driving circuit columns is arranged in the second direction, and the driving circuit column includes a plurality of subpixel driving circuits arranged in the first direction. For example, the first direction intersects the second direction. For example, the first direction includes a longitudinal direction, and the second direction includes a transverse direction.

For example, the subpixel includes a subpixel driving circuit and a light-emitting element. The subpixel driving circuit is coupled to an anode of the light-emitting element, and configured to provide a driving signal to the light-emitting element, so as to drive the light-emitting element to emit light.

For example, the plurality of driving circuit columns includes a plurality of column units QL arranged in the second direction, the column unit QL includes at least two driving circuit columns proximate to each other, and each driving circuit column merely belongs to one column unit QL.

For example, the data line coupled to the subpixel driving circuits included in the column unit QL is merely arranged at the first side of the column unit QL; or the data line coupled to the subpixel driving circuits included in the column unit QL is merely arranged at the second side of the column unit QL; or in the data lines coupled to the subpixel driving circuits included in the column unit QL, a part of the data lines are arranged at the first side, and the other part of the data lines are arranged at the second side.

Based on the above-mentioned specific structure of the display substrate, in the embodiments of the present disclosure, the data lines coupled to the subpixel driving circuits included in the column unit QL are arranged at the first side and/or the second side of the column unit QL, so that the data line is arranged far away from each subpixel driving circuit in the column unit QL. In a case that a data signal transmitted by the data line changes, it is able to reduce an influence on the stability of key nodes in the subpixel driving circuit, thereby to ensure the stability of the subpixel driving circuit.

As shown in FIGS. 1 and 2, in some embodiments of the present disclosure, the column unit QL includes at least one first driving circuit column QL1 and at least one second driving circuit column QL2, and the first driving circuit columns QL1 and the second driving circuit columns QL2 are arranged alternately in the second direction.

The first driving circuit column QL1 includes a plurality of first subpixel driving circuits Q1 and a plurality of second subpixel driving circuits Q2, the first subpixel driving circuits Q1 and the second subpixel driving circuits Q2 are arranged alternately in the first direction, the first subpixel driving circuit Q1 is coupled to a first-color light-emitting element, the second subpixel driving circuit Q2 is coupled to a second-color light-emitting element, the first subpixel driving circuits Q1 in the first driving circuit column QL1 are coupled to a same data line, and the second subpixel driving circuits Q2 in the first driving circuit column QL1 are coupled to a same data line.

The subpixel driving circuit in the second driving circuit column QL2 is coupled to a third-color light-emitting element, and the subpixel driving circuits in the second driving circuit column QL2 are coupled to a same data line.

For example, the first-color light-emitting element includes a red light-emitting element, the second-color light-emitting element includes a blue light-emitting element, and the third-color light-emitting element includes a green light-emitting element. However, the present disclosure is not limited thereto.

For example, in the first driving circuit columns QL1 proximate to each other, odd-numbered subpixel driving circuits in one of the first driving circuit columns QL1 are the first subpixel driving circuits Q1, and even-numbered subpixel driving circuits are the second subpixel driving circuits Q2. In the of the first driving circuit columns QL1, even-numbered subpixel driving circuits are the first subpixel driving circuits Q1, and odd-numbered subpixel driving circuits are the second subpixel driving circuits Q2.

For example, the data line coupled to the first subpixel driving circuits Q1 in the first driving circuit column QL1, the data line coupled to the second subpixel driving circuits Q2 in the first driving circuit column QL1 and the data line coupled to the subpixel driving circuits in the second driving circuit column QL2 are arranged at the first side and/or the second side of the column unit QL to which the driving circuit columns belong. More specifically, the data line coupled to the first subpixel driving circuits Q1 in the first driving circuit column QL1 and the data line coupled to the second subpixel driving circuits Q2 in the first driving circuit column QL1 are arranged at the first side of the column unit QL, and the data line coupled to the subpixel driving circuits in the second driving circuit column QL2 are arranged at the second side of the column unit QL.

In the above display substrate according to the embodiments of the present disclosure, the light-emitting elements coupled to the subpixel driving circuits corresponding to the data line emit light in a same color. In a case that the subpixels are scanned progressively using a shift register unit, i.e., in a case that the data signal is applied by the data line to the coupled subpixels sequentially, a voltage of the data signal varies within a very small range or remains unchanged. At this time, a driving chip does not need to charge the data signal repeatedly in a jumping manner, so that the data line provides the data signal to the subpixels within respective ranges. In this way, it is able to reduce the power consumption of the driving chip, thereby to reduce the overall power consumption of a display product.

More specifically, in a case that a red image and a blue image are displayed, the data signals transmitted by the first data line DA1 and the second data line DA2 do not jump, so as to effectively reduce the power consumption of the driving chip.

As shown in FIGS. 1 and 2, in some embodiments of the present disclosure, the data line coupled to the first subpixel driving circuits Q1 in the first driving circuit column QL1 and the data line coupled to the second subpixel driving circuits Q2 in the first driving circuit column QL1 are arranged at the first side of the column unit QL, and the data line coupled to the subpixel driving circuits in the second driving circuit column QL2 is arranged at the second ide of the column unit QL.

Based on the above arrangement, the data line is arranged far away from each subpixel driving circuit in the column unit QL. In a case that the data signal transmitted by the data line changes, it is able to reduce the influence on the stability of the key nodes in the subpixel driving circuits, thereby to ensure the stability of the subpixel driving circuit.

Based on the above arrangement, the data lines corresponding to the column unit QL are arranged dispersedly at two sides of the column unit QL, so as to not only ensure the connection reliability between the data line and the subpixel driving circuit, but also reduce a layout difficulty of the data line and the column unit QL.

As shown in FIGS. 1 and 2, in some embodiments of the present disclosure, the column unit QL includes two first driving circuit columns QL1 and two second driving circuit columns QL2, the first subpixel driving circuits Q1 included in the two first driving circuit columns QL1 are coupled to a same first data line DA1, the second subpixel driving circuits Q2 included in the two first driving circuit columns QL1 are coupled to a same second data line DA2, third subpixel driving circuits Q3 included in a first one of the second driving circuit columns QL2 are coupled to a same third data line DA3, and fourth subpixel driving circuits Q4 included in a second one of the second driving circuit columns QL2 are coupled to a same fourth data line DA4. The first data line DA1, the second data line DA2, the third data line DA3 and the fourth data line DA4 are arranged sequentially in the second direction.

For example, the first data line DA1 and the second data line DA2 are arranged at the first side of the column unit QL, and the third data line DA3 and the fourth data line DA4 are arranged at the second side of the column unit QL.

For example, each data line is coupled to the corresponding subpixel driving circuits via a corresponding conductive connection member 513. At least a part of the data line extends in the first direction, and at least a part of the conductive connection member 513 extends in the second direction.

For example, the data line is arranged at a same layer, and made of a same layer, as a third source/drain metal layer in the display substrate, and the conductive connection member 513 is arranged at a same layer, and made of a same layer, as a second source/drain metal layer in the display substrate.

Based on the above arrangement, it is able to effectively reduce the quantity of data lines, and reduce the layout difficulty of the data lines and the column units QL. In addition, in the display substrate according to the embodiments of the present disclosure, the light-emitting elements coupled to the subpixel driving circuits coupled to the data line emit light in a same color. In a case that the subpixels are scanned progressively using a shift register unit, i.e., in a case that the data signal is applied by the data line to the coupled subpixels sequentially, a voltage of the data signal varies within a very small range or remains unchanged. At this time, the driving chip does not need to charge the data signal repeatedly in a jumping manner, so that the data line provides the data signal to the subpixels within respective ranges. In this way, it is able to reduce the power consumption of the driving chip, thereby to reduce the overall power consumption of the display product. Based on the above arrangement, the display substrate may use an Advanced Diamond Pixel (ADP) technology.

Based on the above, the first data line DA1, the second data line DA2, the third data line DA3 and the fourth data line DA4 are arranged at the first side and/or the second side of the column unit QL, so as to provide the data line far away from the subpixel driving circuit in the column unit QL, and reduce a coupling capacitance generated between the data line and the key node in the subpixel driving circuit. In a case that the data signal transmitted by the data line changes, it is able to reduce the influence on the stability of the key node in the subpixel driving circuits, thereby to ensure the stability of the subpixel driving circuit.

As shown in FIGS. 1 and 2, in some embodiments of the present disclosure, the column unit QL includes a plurality of sub-units QLZ arranged sequentially in the first direction, and each of the sub-units QLZ includes two driving circuit rows arranged in the first direction.

A first one of the driving circuit rows QH1 includes the first subpixel driving circuit Q1, the third subpixel driving circuit Q3, the second subpixel driving circuit Q2 and the fourth subpixel diving circuit Q4 arranged sequentially in the second direction, and a second one of the driving circuit rows QH2 includes the second subpixel driving circuit Q2, the third subpixel driving circuit Q3, the first subpixel driving circuit Q1 and the fourth subpixel driving circuit Q4 arranged sequentially in the second direction.

The first data line DA1 and the second data line DA2 are arranged at the first side of the column unit QL, and the third data line DA3 and the fourth data line DA4 are arranged at the second side of the column unit QL.

For example, the sub-unit QLZ serves as a minimum repeat unit in the display substrate, and the display substrate includes a plurality of sub-units QLZ arranged in an array form.

For example, the first data line DA1 is coupled to the first subpixel driving circuit Q1 in the first one of the driving circuit rows QH1, and the first subpixel driving circuit Q1 in the second one of the driving circuit rows QH2. The second data line DA2 is coupled to the second subpixel driving circuit Q2 in the first one of the driving circuit rows QH1, and the second subpixel driving circuit Q2 in the second one of the driving circuit rows QH2. The third data line DA3 is coupled to the third subpixel driving circuit Q3 in the first one of the driving circuit rows QH1, and the third subpixel driving circuit Q3 in the second one of the driving circuit rows QH2. The fourth data line DA4 is coupled to the fourth subpixel driving circuit Q4 in the first one of the driving circuit rows QH1, and the fourth subpixel driving circuit Q4 in the second one of the driving circuit rows QH2.

Based on the above arrangement it is able to effectively reduce the quantity of data lines, and reduce the layout difficulty of the data lines and the column units QL. In addition, based on the above arrangement, it is able to reduce the power consumption of the driving chip, thereby to reduce the overall power consumption of the display product. Moreover, in a case that the data lines are arranged as mentioned hereinabove, the data line is arranged far away from the subpixel driving circuit in the column unit QL. In a case that the data signal transmitted by the data line changes, it is able to reduce the influence on the stability of the key nodes in the subpixel driving circuits, thereby to ensure the stability of the subpixel driving circuit.

As shown in FIGS. 3 to 26, in some embodiments of the present disclosure, the first subpixel driving circuit Q1 in the first one of the driving circuit rows includes a driving transistor (i.e., a third transistor T3) and a data write-in transistor (i.e., a fourth transistor T4), a second electrode of the data write-in transistor is coupled to a second electrode of the driving transistor, and the first data line DA1 is coupled to a first electrode of the data write-in transistor via a first conductive connection member 51.

As shown in FIGS. 4, 5, 6, 13, 17, 21, 23 and 24, the data write-in transistor includes a data write-in active layer (i.e., a fourth active layer 14), and an orthogonal projection of the data write-in active layer onto the base substrate is arranged between a first data body DA11 included in the first data line DA1 onto the base substrate and an orthogonal projection of a second data body DA21 included in the second data line DA2 onto the base substrate.

For example, the first data line DA1 includes the first data body DA11 and a first data extension member DA12, the first data body DA11 includes at least a portion extending in the first direction, and the first data extension member DA12 protrudes from the first data body DA11 in the second direction. The second data line DA2 includes the second data body DA21 and a second data extension member DA22, the second data body DA21 includes at least a portion extending in the first direction, and the second data extension member DA22 protrudes from the first data body DA11 in the second direction.

For example, layout regions of the first data body DA11 and the first subpixel driving circuit Q1 are arranged in the second direction. At least a part of the second data body DA21 is arranged at the layout region of the first subpixel driving circuit Q1.

For example, the display substrate further includes a reference signal line Vref and an initialization signal line Vinit1. The first conductive connection member 31 includes a first sub-portion 311 and a second sub-portion 312 coupled to each other, the first sub-portion 311 extends in the second direction, the second sub-portion 312 extends in the first direction, the first sub-portion 311 is coupled to the first data line DA1, and the second sub-portion 312 is coupled to the first electrode of the data write-in transistor.

At least a part of an orthogonal projection of the first sub-portion 311 onto the base substrate is arranged between an orthogonal projection of the reference signal line Vref onto the base substrate and an orthogonal projection of the initialization signal line Vinit1 onto the base substrate.

For example, the first sub-portion 311 and the second sub-portion 312 form an integral piece.

For example, an orthogonal projection of the first sub-portion 311 onto the base substrate partially overlaps with an orthogonal projection initialization signal line Vinit1 onto the base substrate.

Based on the above arrangement, the first data line DA1 is coupled to the first electrode of the data write-in transistor via the first conductive connection member 31, so that the first data body DA11 is arranged at a position far away from the key node of the subpixel driving circuit. In this way, it is able to reduce the influence caused by the data line on the key node and reduce the layout difficulty of the first data line DA1.

Based on the above arrangement, the orthogonal projection of the data write-in active layer onto the base substrate is arranged between the orthogonal projection of the first data body DA11 onto the base substrate and the orthogonal projection of the second data body DA21 onto the base substrate, so that the first data line DA1 and the second data line DA2 are both arranged at the first side of the column unit QL and arranged proximate to an edge of the column unit QL as possible. In this way, it is able to reduce the influence caused by the data line on the key node in a current column unit QL, and reduce the influence caused by the data line on the key node in an adjacent column unit QL.

As shown in FIGS. 4, 5, 6, 13, 17, 21, 23 and 24, in some embodiments of the present disclosure, the first subpixel driving circuit Q1 in the second one of the driving circuit rows QH2 includes a driving transistor and a data write-in transistor, a second electrode of the data write-in transistor is coupled to a second electrode of the driving transistor, and the first data line DA1 is coupled to a first electrode of the data write-in transistor via a second conductive connection member 32.

The data write-in transistor includes a data write-in active layer, and an orthogonal projection of the data write-in active layer onto the base substrate is arranged between an orthogonal projection of a second data body DA21 included in the second data line DA2 onto the base substrate and an orthogonal projection of a third data body DA31 included in the third data line DA3 onto the base substrate.

For example, the third data line DA3 includes the third data body DA31 and a third data extension member DA32, the third data body DA31 includes at least a portion extending in the first direction, and the third data extension member DA32 protrudes from the first data body DA11 in the second direction.

For example, the second conductive connection member 32 includes a third sub-portion 321 and a fourth sub-portion 322 coupled to each other, a least a part of the third sub-portion extends 321 in the second direction, a least a part of the fourth sub-portion 322 surrounds a sensing aperture region of the display substrate, the third sub-portion 321 is coupled to the first data line DA1, and the fourth sub-portion 322 is coupled to the first electrode of the data write-in transistor.

For example, the third sub-portion 321 and the fourth sub-portion 322 form an integral piece.

For example, the fourth sub-portion 322 bypasses the sensing aperture region and is coupled to the first electrode of the data write-in transistor.

For example, the display substrate further includes a reference signal line Vref and an initialization signal line Vinit1, and an orthogonal projection of the third sub-portion 321 onto the base substrate is arranged between an orthogonal projection of the reference signal line Vref onto the base substrate and an orthogonal projection of the initialization signal line Vinit1 onto the base substrate.

For example, the orthogonal projection of the third sub-portion 321 onto the base substrate partially overlaps with the orthogonal projection of the initialization signal line Vinit1 onto the base substrate.

For example, an orthogonal projection of the fourth sub-portion 322 onto the base substrate at least partially overlaps with the orthogonal projection of the initialization signal line Vinit1 onto the base substrate, and/or the orthogonal projection of the fourth sub-portion 322 onto the base substrate at least partially overlaps with the orthogonal projection of the reference signal line Vref onto the base substrate.

Based on the above arrangement, the first data line DA1 is coupled to the first electrode of the data write-in transistor via the second conductive connection member 32, so that the first data body DA11 is arranged at a position far away from the key node of the subpixel driving circuit. In this way, it is able to reduce the influence caused by the key node, and reduce the layout difficulty of the first data line DA1.

Based on the above arrangement, the orthogonal projection of the data write-in active layer onto the base substrate is arranged between the orthogonal projection of the second data body DA21 onto the base substrate and the orthogonal projection of the third data body DA31 onto the base substrate, so that the second data line DA2 is arranged at the first side of the column unit QL, the third data line DA3 is arranged at the second side of the column unit QL, and the data lines are both arranged proximate to an edge of the column unit QL as possible. In this way, it is able to reduce the influence caused by the data line on the key node in a current column unit QL, and reduce the influence caused by the data line on the key node in an adjacent column unit QL.

As shown in FIGS. 4, 5, 6, 13, 17, 21, 23 and 24, in some embodiments of the present disclosure, the second subpixel driving circuit Q2 in the first one of the driving circuit rows QH1 includes a driving transistor and a data write-in transistor, a second electrode of the data write-in transistor is coupled to a second electrode of the driving transistor, and the second data line DA2 is coupled to a first electrode of the data write-in transistor via a third conductive connection member 33.

The data write-in transistor includes a data write-in active layer, and an orthogonal projection of the data write-in active layer onto the base substrate is arranged between an orthogonal projection of a second data body DA21 included in the second data line DA2 onto the base substrate and an orthogonal projection of a third data body DA31 included in the third data line DA3 onto the base substrate.

For example, the display substrate further includes a first scanning line GA1, the second subpixel driving circuit Q2 in the first one of the driving circuit rows QH1 further includes a compensation transistor, a first electrode of the compensation transistor is coupled to a first electrode of the driving transistor, a second electrode of the compensation transistor is coupled to a gate electrode of the driving transistor, and a gate electrode of the compensation transistor is coupled to a corresponding first scanning line GA1. The third conductive connection member 33 includes a fifth sub-portion 331 and a sixth sub-portion 332 coupled to each other, the fifth sub-portion 331 is coupled to the second data line DA2, the sixth sub-portion 332 is coupled to the first electrode of the data write-in transistor, and an orthogonal projection of the fifth sub-portion 331 onto the base substrate at least partially overlaps with an orthogonal projection of the first scanning line GA1 onto the base substrate.

For example, the fifth sub-portion 331 and the sixth sub-portion 332 form an integral piece.

For example, the first scanning line GA1 includes a first scanning layer GA11 and a second scanning layer GA12, the first scanning layer is arranged at a same layer, and made of a same material, as a second gate metal layer in the display substrate, and the second scanning layer is arranged at a same layer, and made of a same material, as a third gate metal layer in the display substrate.

For example, the orthogonal projection of the fifth sub-portion 331 onto the base substrate at least partially overlaps with an orthogonal projection of the first scanning layer onto the base substrate, and/or an orthogonal projection of the sixth sub-portion 332 onto the base substrate at least partially overlaps with an orthogonal projection of the second scanning layer onto the base substrate.

For example, the display substrate further includes a second scanning line GA2, a gate electrode of the data write-in transistor is coupled to a corresponding second scanning line GA2, and at least a part of the orthogonal projection of the fifth sub-portion 331 onto the base substrate is arranged between an orthogonal projection of the second scanning line GA2 onto the base substrate and an orthogonal projection of a gate electrode of the driving transistor onto the base substrate.

Based on the above arrangement, the second data line DA2 is coupled to the first electrode of the data write-in transistor via the third conductive connection member 33, so that the second data body DA21 is arranged at a position far away from the key node of the subpixel driving circuit. In this way, it is able to reduce the influence caused by the data line on the key node, and reduce the layout difficulty of the second data line DA2.

Based on the arrangement, the orthogonal projection of the data write-in active layer onto the base substrate is arranged between the orthogonal projection of the second data body DA21 onto the base substrate and the orthogonal projection of the third data body DA31 onto the base substrate, so that the second data line DA2 is arranged at the first side of the column unit QL, the third data line DA3 is arranged at the second side of the column unit AL, and the data lines are arranged proximate to an edge of the column unit QL as possible. In this way, it is able to not only reduce the influence caused by the data line on the key node in the current column unit QL, but also reduce the influence caused by the data line on the key node in the adjacent column unit QL.

As shown in FIGS. 4, 5, 6, 13, 17, 21, 23 and 24, in some embodiments of the present disclosure, the second subpixel driving circuit Q2 in the second one of the driving circuit rows QH2 includes a driving transistor and a data write-in transistor, a second electrode of the data write-in transistor is coupled to a second electrode of the driving transistor, and the second data line DA2 is coupled to a first electrode of the data write-in transistor via a fourth conductive connection member 34.

The data write-in transistor includes a data write-in active layer, and an orthogonal projection of the data write-in active layer onto the base substrate is arranged between an orthogonal projection of a first data body DA11 included in the first data line DA1 onto the base substrate and an orthogonal projection of a second data body DA21 included in the second data line DA2 onto the base substrate.

For example, the display substrate further includes a second scanning line GA2, and a gate electrode of the data write-in transistor is coupled to a corresponding second scanning line GA2. The fourth conductive connection member 34 includes a seventh sub-portion 341 and an eighth sub-portion 342 coupled to each other, the seventh sub-portion 341 extends in the second direction, the eighth sub-portion 342 extends in the first direction, the seventh sub-portion 341 is coupled to the second data line DA2, and the eighth sub-portion is coupled to the first electrode of the data write-in transistor. At least a part of the seventh sub-portion 341 onto the base substrate is arranged between an orthogonal projection of the second scanning line GA2 onto the base substrate and an orthogonal projection of a gate electrode of the driving transistor onto the base substrate.

For example, the seventh sub-portion 341 and the eighth sub-portion 342 form an integral piece.

For example, the orthogonal projection of the seventh sub-portion 341 onto the base substrate at least partially overlaps with the orthogonal projection of the first scanning layer onto the base substrate, and/or the orthogonal projection of the seventh sub-portion 341 onto the base substrate at least partially overlaps with the orthogonal projection of the second scanning layer onto the base substrate.

Based on the above arrangement, the second data line DA2 is coupled to the first electrode of the data write-in transistor via the fourth conductive connection member 34, so that the second data body DA21 is arranged at a position far away from the subpixel driving circuit. In this way, it is able to reduce the influence caused by the data line on the key node, and reduce the layout difficulty of the second data line DA2.

Based on the above arrangement, the orthogonal projection of the data write-in active layer onto the base substrate is arranged between the orthogonal projection of the first data body DA11 onto the base substrate and the orthogonal projection of the second data body DA21 onto the base substrate, so that the first data line DA1 and the second data line DA2 are both arranged at the first side of the column unit QL and arranged proximate to an edge of the column unit QL as possible. In this way, it is able to reduce the influence caused by the data line on the key node in the current column unit QL, and reduce the influence caused by the data line on the key node in the adjacent column unit QL.

As shown in FIGS. 4, 5, 6, 13, 17, 21, 23 and 24, in some embodiments of the present disclosure, the third subpixel driving circuit Q3 in the first one of the driving circuit rows QH1 includes a driving transistor and a data write-in transistor, a second electrode of the data write-in transistor is coupled to a second electrode of the driving transistor, and the third data line DA3 is coupled to a first electrode of the data write-in transistor via a fifth conductive connection member 35.

The data write-in transistor includes a data write-in active layer, and an orthogonal projection of the data write-in active layer onto the base substrate is arranged between an orthogonal projection of a second data body DA21 included in the second data line DA2 onto the base substrate and an orthogonal projection of a third data body DA31 included in the third data line DA3 onto the base substrate.

For example, the fifth conductive connection member 35 includes a ninth sub-portion 351 and a tenth sub-portion 352 coupled to each other, at least a part of the ninth sub-portion 351 extends in the second direction, at least a part of the tenth sub-portion 352 surrounds a sensing aperture region of the display substrate, the ninth sub-portion 351 is coupled to the third data line DA3, and the tenth sub-portion 352 is coupled to the first electrode of the data write-in transistor.

For example, the ninth sub-portion 351 and the tenth sub-portion 352 form an integral piece.

For example, the tenth sub-portion 352 bypasses the sensing aperture region and is coupled to the first electrode of the data write-in transistor.

For example, an orthogonal projection of the ninth sub-portion 351 onto the base substrate partially overlaps with an orthogonal projection initialization signal line Vinit1 onto the base substrate. The orthogonal projection of the ninth sub-portion 351 onto the base substrate does not overlap with an orthogonal projection of the reference signal line Vref onto the base substrate.

For example, the display substrate further includes a reference signal line Vref and an initialization signal line Vinit1, and at least a part of an orthogonal projection of the ninth sub-portion 351 onto the base substrate is arranged between an orthogonal projection of the reference signal line Vref onto the base substrate and an orthogonal projection of the initialization signal line Vinit1 onto the base substrate. An orthogonal projection of the tenth sub-portion 352 onto the base substrate at least partially overlaps with the orthogonal projection of the initialization signal line Vinit1 onto the base substrate, and/or the orthogonal projection of the tenth sub-portion 352 onto the base substrate at least partially overlaps with the orthogonal projection of the reference signal line Vref onto the base substrate.

Based on the above arrangement, the third data line DA3 is coupled to the first electrode of the data write-in transistor via the fifth conductive connection member 35, so that the third data body DA31 is arranged at a position far away from the key node of the subpixel driving circuit. In this way, it is able to reduce the influence caused by the data line on the key node, and reduce the layout difficulty of the third data line DA3.

Based on the above arrangement, the orthogonal projection of the data write-in active layer onto the base substrate is arranged between the orthogonal projection of the second data body DA21 onto the base substrate and the orthogonal projection of the third data body DA31 onto the base substrate, so that the second data line DA2 is arranged at the first side of the column unit QL, the third data line DA3 is arranged at the second side of the column unit QL, and the data lines are arranged proximate to an edge of the column unit QL as possible. In this way, it is able to reduce the influence caused by the data line on the key node in the current column unit QL, and reduce the influence caused by the data line on the key node in the adjacent column unit QL.

As shown in FIGS. 4, 5, 6, 13, 17, 21, 23 and 24, in some embodiments of the present disclosure, the third subpixel driving circuit Q3 in the second one of the driving circuit rows QH2 includes a driving transistor and a data write-in transistor, a second electrode of the data write-in transistor is coupled to a second electrode of the driving transistor, and the third data line DA3 is coupled to a first electrode of the data write-in transistor via a sixth conductive connection member 36.

The data write-in transistor includes a data write-in active layer, and an orthogonal projection of the data write-in active layer onto the base substrate is arranged between an orthogonal projection of a second data body DA21 included in the second data line DA2 onto the base substrate and an orthogonal projection of a third data body DA31 included in the third data line DA3 onto the base substrate.

For example, the display substrate further includes a second scanning line GA2, and a gate electrode of the data write-in transistor is coupled to a corresponding second scanning line GA2. The sixth conductive connection member 36 includes an eleventh sub-portion 361 and a twelfth sub-portion 362 coupled to each other, the eleventh sub-portion 361 extends in the second direction, the twelfth sub-portion 362 extends in the first direction, the eleventh sub-portion 361 is coupled to the third data line DA3, and the twelfth sub-portion 362 is coupled to the first electrode of the data write-in transistor.

For example, the eleventh sub-portion 361 and the twelfth sub-portion 362 form an integral piece.

For example, at least a part of an orthogonal projection of the eleventh sub-portion 361 onto the base substrate is arranged between an orthogonal projection of the second scanning line GA2 onto the base substrate and an orthogonal projection of a gate electrode of the driving transistor onto the base substrate.

For example, the orthogonal projection of the eleventh sub-portion 361 onto the base substrate at least partially overlaps with the orthogonal projection of the first scanning line GA1 onto the base substrate.

For example, the orthogonal projection of the eleventh sub-portion 361 onto the base substrate at least partially overlaps with the orthogonal projection of the first scanning layer onto the base substrate, and/or the orthogonal projection of the eleventh sub-portion 361 onto the base substrate at least partially overlaps with the orthogonal projection of the second scanning layer onto the base substrate.

Based on the above arrangement, the third data line DA3 is coupled to the first electrode of the data write-in transistor via the sixth conductive connection member 36, so that the third data body DA31 is arranged at a position far away from the key node of the subpixel driving circuit. In this way, it is able to reduce the influence caused by the data line on the key node and reduce the layout difficulty of the third data line DA3.

Based on the above arrangement, the orthogonal projection of the data write-in active layer onto the base substrate is arranged between the orthogonal projection of the second data body DA21 onto the base substrate and the orthogonal projection of the third data body DA31 onto the base substrate, so that second first data line DA2 is arranged at the first side of the column unit QL, the third data line DA3 is arranged at the second side of the column unit QL, and the data lines are arranged proximate to an edge of the column unit QL as possible. In this way, it is able to reduce the influence caused by the data line on the key node in the current column unit QL, and reduce the influence caused by the data line on the key node in the adjacent column unit QL.

As shown in FIGS. 4, 5, 6, 13, 17, 21, 23 and 24, in some embodiments of the present disclosure, the fourth subpixel driving circuit Q4 in the first one of the driving circuit rows QH1 includes a driving transistor and a data write-in transistor, a second electrode of the data write-in transistor is coupled to a second electrode of the driving transistor, and the fourth data line DA4 is coupled to a first electrode of the data write-in transistor via a seventh conductive connection member 37.

The data write-in transistor includes a data write-in active layer, and an orthogonal projection of the data write-in active layer onto the base substrate is arranged between an orthogonal projection of a third data body DA31 included in the third data line DA3 onto the base substrate and an orthogonal projection of a fourth data body DA41 included in the fourth data line DA4 onto the base substrate.

For example, the fourth data line DA4 includes a fourth data body DA41 and a fourth data extension member DA42. The fourth data body DA41 includes at least a portion extends in the first direction, and the second data extension member DA42 protrudes from the fourth data body DA41 in the second direction.

For example, the display substrate further includes a first scanning line GA1, the fourth subpixel driving circuit Q4 in the first one of the driving circuit rows QH1 further includes a compensation transistor, a first electrode of the compensation transistor is coupled to a first electrode of the driving transistor, a second electrode of the compensation transistor is coupled to a gate electrode of the driving transistor, and a gate electrode of the compensation transistor is coupled to a corresponding first scanning line GA1.

The seventh conductive connection member 37 includes a thirteenth sub-portion 371 and a fourteenth sub-portion 372 coupled to each other, the thirteenth sub-portion 371 is coupled to the fourth data line DA4, the fourteenth sub-portion 372 is coupled to the first electrode of the data write-in transistor, and an orthogonal projection of the thirteenth sub-portion 371 onto the base substrate at least partially overlaps with an orthogonal projection of the first scanning line GA1 onto the base substrate.

For example, the thirteenth sub-portion 371 and the fourteenth sub-portion 372 form an integral piece.

For example, an orthogonal projection of the thirteenth sub-portion 371 onto the base substrate at least partially overlaps with the orthogonal projection of the first scanning layer onto the base substrate, and/or the orthogonal projection of the thirteenth sub-portion 371 onto the base substrate at least partially overlaps with the orthogonal projection of the second scanning layer onto the base substrate.

For example, the orthogonal projection of the thirteenth sub-portion 371 onto the base substrate is arranged between an orthogonal projection of the second scanning line GA2 onto the base substrate and an orthogonal projection of the gate electrode of the driving transistor onto the base substrate.

Based on the above arrangement, the fourth data line DA4 is coupled to the first electrode of the data write-in transistor via the seventh conductive connection member 37, so that the fourth data body DA41 is arranged at a position far away from the key node of the subpixel driving circuit. In this way, it is able to reduce the influence caused by the key node, and reduce the layout difficulty of the fourth data line DA4.

Based on the above arrangement, the orthogonal projection of the data write-in active layer onto the base substrate is arranged between the orthogonal projection of the third data body DA31 in the third data line DA3 onto the base substrate and the orthogonal projection of the fourth data body DA41 in the fourth data line DA4 onto the base substrate, so that the third data line DA3 and the fourth data line DA4 are both arranged at the second side of the column unit QL and are arranged proximate to an edge of the column unit QL as possible. In this way, it is able to reduce the influence caused by the data line on the key node in the current column unit QL, and reduce the influence caused by the data line on the key node in the adjacent column unit QL.

As shown in FIGS. 4, 5, 6, 13, 17, 21, 23 and 24, in some embodiments of the present disclosure, the fourth subpixel driving circuit Q4 in the second one of the driving circuit rows QH2 includes a driving transistor and a data write-in transistor, a second electrode of the data write-in transistor is coupled to a second electrode of the driving transistor, and the fourth data line DA4 is coupled to a first electrode of the data write-in transistor via an eighth conductive connection member 38.

The data write-in transistor includes a data write-in active layer, and an orthogonal projection of the data write-in active layer onto the base substrate is arranged between an orthogonal projection of a third data body DA31 included in the third data line DA3 onto the base substrate and an orthogonal projection of a fourth data body DA41 included in the fourth data line DA4 onto the base substrate.

For example, the display substrate further includes a reference signal line Vref and an initialization signal line Vinit1, the eighth conductive connection member 38 includes a fifteenth sub-portion 381 and a sixteenth sub-portion 382 coupled to each other, at least a part of the fifteenth sub-portion 381 extends in the second direction, at least a part of the sixteenth sub-portion 382 extends in the first direction, the fifteenth sub-portion 381 is coupled to the fourth data line DA4, and the sixteenth sub-portion 382 is coupled to the first electrode of the data write-in transistor.

At least a part of an orthogonal projection of the fifteenth sub-portion 381 onto the base substrate is arranged between an orthogonal projection of the reference signal line Vref onto the base substrate and an orthogonal projection of the initialization signal line Vinit1 onto the base substrate.

For example, the fifteenth sub-portion 381 and the sixteenth sub-portion 382 form an integral piece.

For example, the orthogonal projection of the fifteenth sub-portion 381 onto the base substrate at least partially overlaps with the orthogonal projection of the initialization signal line Vinit1 onto the base substrate.

Based on the above arrangement, the fourth data line DA4 is coupled to the first electrode of the data write-in transistor via the eighth conductive connection member 38, so that the fourth data body DA41 is arranged at a position far away from the key node of the subpixel driving circuit. In this way, it is able to reduce the influence caused by the key node, and reduce the layout difficulty of the fourth data line DA4.

Based on the above arrangement, the orthogonal projection of the data write-in active layer onto the base substrate is arranged between the orthogonal projection of the third data body DA31 included in the third data line DA3 onto the base substrate and the orthogonal projection of the fourth data body DA41 included in the fourth data line DA4 onto the base substrate, so that the third data line DA3 and the fourth data line DA4 are both arranged at the second side of the column unit QL, and are arranged proximate to an edge of the column unit QL as possible. In this way, it is able to reduce the influence caused by the data line on the key node in the current column unit QL, and reduce the influence caused by the data line on the key node in the adjacent column unit QL.

As shown in FIG. 18, in some embodiments of the present disclosure, the first sub-portion 311, the fifth sub-portion 331, the seventh sub-portion 341, the eleventh sub-portion 361, the thirteenth sub-portion 371 and the fifteenth sub-portion 381 extend to a middle region of the column unit QL as possible, so as to improve the uniformity of the display substrate in a better manner.

As shown in FIGS. 4, 6, 13, 14, 17, 21, 23 and 24, in some embodiments of the present disclosure, each of the subpixel driving circuits in the display substrate includes a driving transistor and a compensation transistor (i.e., a second transistor T2), a first electrode of the compensation transistor is coupled to a first electrode of the driving transistor, a second electrode of the compensation transistor is coupled to a gate electrode of the driving transistor via a first adaption pattern 51, and at least a part of an orthogonal projection of the first adaption pattern 51 onto the base substrate is arranged between an orthogonal projection of the second data line DA2 onto the base substrate and an orthogonal projection of the third data line DA3 onto the base substrate.

For example, a first node N1 of the subpixel driving circuit is formed through a structure coupled to the first adaption pattern 51 at a position where the first adaption pattern 51 is located.

For example, the first adaption pattern 51 is arranged at a same layer, and made of a same material, as the first source/drain metal layer in the display substrate.

Based on the above arrangement, at least a part of the orthogonal projection of the first adaption pattern 51 onto the base substrate is arranged between the orthogonal projection of the second data line DA2 onto the base substrate and the orthogonal projection of the third data line DA3 onto the base substrate, so that the first adaption pattern 51 is located in the middle, and the first adaption pattern 51 is arranged far away from each of the first data line DA1, the second data line DA2, the third data line DA3 and the fourth data line DA4. In this way, it is able to minimize the influence caused by the jump of the data signal transmitted by the data line on the first node N1, thereby to prevent the occurrence of crosstalk.

As shown in FIGS. 4, 6, 13, 14, 17, 21, 23 and 24, in some embodiments of the present disclosure, the first adaption pattern 51 includes a first end 511, a second end 512 and a connection member 513 coupled to the first end 511 and the second end 512, the first end 511 is coupled to the gate electrode of the driving transistor, the second end 512 is coupled to the second electrode of the compensation transistor, and the connection member 513 extends in the second direction.

For example, the first end 511, the second end 512 and the connection member 513 form an integral piece.

For example, the first end 511 is at least partially staggered with the second end 512 in the first direction.

Based on the above arrangement, the connection member 512 extends in the second direction, so that at least a part of the first adaption pattern 51 is arranged proximate to the middle region of the column unit QL as possible, and the first adaption pattern 51 is arranged far away from each of the first data line DA1, the second data line DA2, the third data line DA3 and the fourth data line DA4. In this way, it is able to minimize the influence caused by the jump of the data signal transmitted by the data line on the first node N1, thereby to prevent the occurrence of crosstalk.

As shown in FIGS. 4, 6, 13, 14, 17, 21, 23 and 24, in some embodiments of the present disclosure, in a layout region of the first one of the driving circuit rows QH1, an orthogonal projection of the first adaption pattern 51 in a layout region of the second subpixel driving circuit Q2 onto the base substrate and an orthogonal projection of the first adaption pattern 51 in a layout region of the third subpixel driving circuit Q3 onto the base substrate are both arranged between the orthogonal projection of the second data line DA2 onto the base substrate and the orthogonal projection of the third data line DA3 onto the base substrate.

As shown in FIGS. 4, 6, 13, 14, 17, 21, 23 and 24, in some embodiments of the present disclosure, in the layout region of the first one of the driving circuit row QH1, an orthogonal projection of the first end 511 in a layout region of the first subpixel driving circuit Q1 onto the base substrate at least partially overlaps with the orthogonal projection of the second data line DA2 onto the base substrate, and an orthogonal projection of the first end 511 in a layout region of the fourth subpixel driving circuit Q4 onto the base substrate at least partially overlaps with the orthogonal projection of the third data line DA3 onto the base substrate.

As shown in FIGS. 4, 6, 13, 14, 17, 21, 23 and 24, in some embodiments of the present disclosure, in a layout region of the second one of the driving circuit rows QH2, an orthogonal projection of the first adaption pattern 51 in a layout region of the first subpixel driving circuit Q1 onto the base substrate and an orthogonal projection of the first adaption pattern 51 in a layout region of the third subpixel driving circuit Q3 onto the base substrate are both arranged between the orthogonal projection of the second data line DA2 onto the base substrate and the orthogonal projection of the third data line DA3 onto the base substrate.

As shown in FIGS. 4, 6, 13, 14, 17, 21, 23 and 24, in some embodiments of the present disclosure, an orthogonal projection of the first end 511 in a layout region of the second subpixel driving circuit Q2 onto the base substrate at least partially overlaps with the orthogonal projection of the second data line DA2 onto the base substrate, and an orthogonal projection of the first end 511 in a layout region of the fourth subpixel driving circuit Q4 onto the base substrate at least partially overlaps with the orthogonal projection of the third data line DA3 onto the base substrate.

Based on the above arrangement, at least a part of the first adaption pattern 51 is arranged proximate to the middle region of the column unit QL as possible, so that at last a part of the first adaption pattern 51 is arranged far away from each of the first data line DA1, the second data line DA2, the third data line DA3 and the fourth data line DA4. In this way, it is able to minimize the influence caused by the jump of the data signal transmitted by the data line on the first node N1, thereby to prevent the occurrence of crosstalk.

Moreover, based on the above arrangement, it is able to minimize an overlapping area between the data line and the node inside the column unit QL, thereby to reduce the loading of a scanning signal in the display substrate.

As shown in FIGS. 3 and 17 to 26, in some embodiments of the present disclosure, the display substrate further includes a power source layer VDD, and an orthogonal projection of the power source layer VDD onto the base substrate covers the orthogonal projection of the first adaption pattern 51 onto the base substrate.

For example, the orthogonal projection of the power source layer VDD onto the base substrate completely covers the orthogonal projection of the first adaption pattern 51 onto the base substrate.

For example, the orthogonal projection of the power source layer VDD onto the base substrate at least partially overlaps with the orthogonal projection of the first adaption pattern 51 onto the base substrate.

Based on the above arrangement, the power source layer VDD is configured to shield and protect the first node, so as to prevent the occurrence of any interference on the first node.

As shown in FIGS. 3 and 17 to 26, in some embodiments of the present disclosure, the power source layer VDD includes a plurality of first power source lines VDD1 and a plurality of second power source lines VDD2, each of the first power source lines VDD1 cross the second power source lines VDD2, and the first power source line VDD1 is coupled to the second power source lines VDD2.

For example, an orthogonal projection of the first power source line VDD1 onto the base substrate covers an orthogonal projection of the first end 511 onto the base substrate.

For example, the orthogonal projection of the first power source line VDD1 onto the base substrate at least partially overlaps with an orthogonal projection of the connection member 513 onto the base substrate.

For example, the orthogonal projection of the first power source line VDD1 onto the base substrate at least partially overlaps with an orthogonal projection of the second end 512 onto the base substrate.

For example, an orthogonal projection of the second power source line VDD2 onto the base substrate covers the orthogonal projection of the second end 512 onto the base substrate.

For example, the orthogonal projection of the second power source line VDD2 onto the base substrate at least partially overlaps with the orthogonal projection of the connection member 513 onto the base substrate.

For example, the orthogonal projection of the second power source line VDD2 onto the base substrate at least partially overlaps with the orthogonal projection of the first end 511 onto the base substrate.

For example, the plurality of first power source lines VDD1 is arranged in the first direction, and the first power source line VDD1 includes at least a portion extending in the second direction. The plurality of second power source lines VDD2 is arranged in the second direction, and the second power source line VDD2 includes at least a portion extending in the first direction.

For example, the first power source line VDD1 is arranged at a same layer, and made of a same material, as a second source/drain metal layer in the display substrate, and the second power source line VDD2 is arranged at a same layer, and made of a same material, as a third source/drain metal layer in the display substrate.

For example, the first power source line VDD1 is coupled to the plurality of second power source lines VDD2, and the second power source line VDD2 is coupled to the plurality of first power source lines VDD1.

Based on the above arrangement, the power source layer VDD includes the first power source lines VDD1 and the second power source lines VDD2, so that the first power source lines VDD1 and the second power source lines VDD2 form a grid-like structure. In this way, it is able to reduce the loading of the power source layer VDD Based on the above arrangement, it is able for the first power source lines VDD1 and the second power source lines VDD2 to shield and protect the first node, thereby to prevent the occurrence of any interference on the first node.

As shown in FIGS. 13 to 15, in some embodiments of the present disclosure, the display substrate further includes a plurality of compensation initialization lines (i.e., an eighth adaption pattern 58), the compensation initialization line is coupled to the plurality of initialization signal lines Vinit1, so that the plurality of compensation initialization lines and the plurality of initialization signal lines Vinit1 form a grid-like structure. In this way, it is able to reduce the loading of the initialization signal lines Vinit1.

As shown in FIGS. 1, 4 and 17, in some embodiments of the present disclosure, the display substrate includes a plurality of first sensing aperture regions 41 and a plurality of second sensing aperture regions 42, each of the first sensing aperture regions 41 is arranged between a layout region of the second subpixel driving circuit Q2 and a layout region of the third subpixel driving circuit Q3 in a corresponding first one of the driving circuit rows QH1, and each of the second sensing aperture regions 42 is arranged between a layout region of the first subpixel driving circuit Q1 and a layout region of the third subpixel driving circuit Q3 in a corresponding second one of the driving circuit rows QH2.

For example, the first sensing aperture regions 41 correspond to the first ones of the driving circuit rows QH1 respectively, and the second sensing aperture regions 41 correspond to the second ones of the driving circuit rows QH2 respectively.

For example, the subpixel driving circuit in the display substrate is used to implement, but not limited to, a Low Temperature Polycrystalline Oxide (LTPO) structure.

For example, the display substrate is compatible with, but not limited to, a Color On Encapsulation (COE) structure.

The display substrate is provided with an under-screen sensor, and the display substrate includes the plurality of first sensing aperture regions 41 and the plurality of second sensing aperture regions 42, so as to meet the transmittance requirement on the under-screen sensor.

Based on the above arrangement, it is able to increase an area of each sensing aperture region, thereby to effectively increase the light transmittance of the display substrate.

The technical solutions in the embodiments of the present disclosure is compatible with an SIP wiring scheme, so as to provide a narrow bezel and facilitate the arrangement of a negative power source signal line VSS in a display region.

More specifically, the technical solutions in the embodiments of the present disclosure is compatible with various circuit structures, e.g., a 7T1C circuit structure (i.e., 7 transistors and 1 capacitor) merely including low temperature poly-silicon (LTPS) transistors, an 8T1C circuit structure (i.e., 8 transistors and 1 capacitor) including both LTPS transistors and LTPO transistors, or a 7T1C circuit structure including LTPS transistors and oxide transistors.

A circuit structure and a layout structure will be described hereinafter in a case that the subpixel driving circuit is a 7T1C circuit structure including the LTPS transistors and the oxide transistors.

Figure 3:
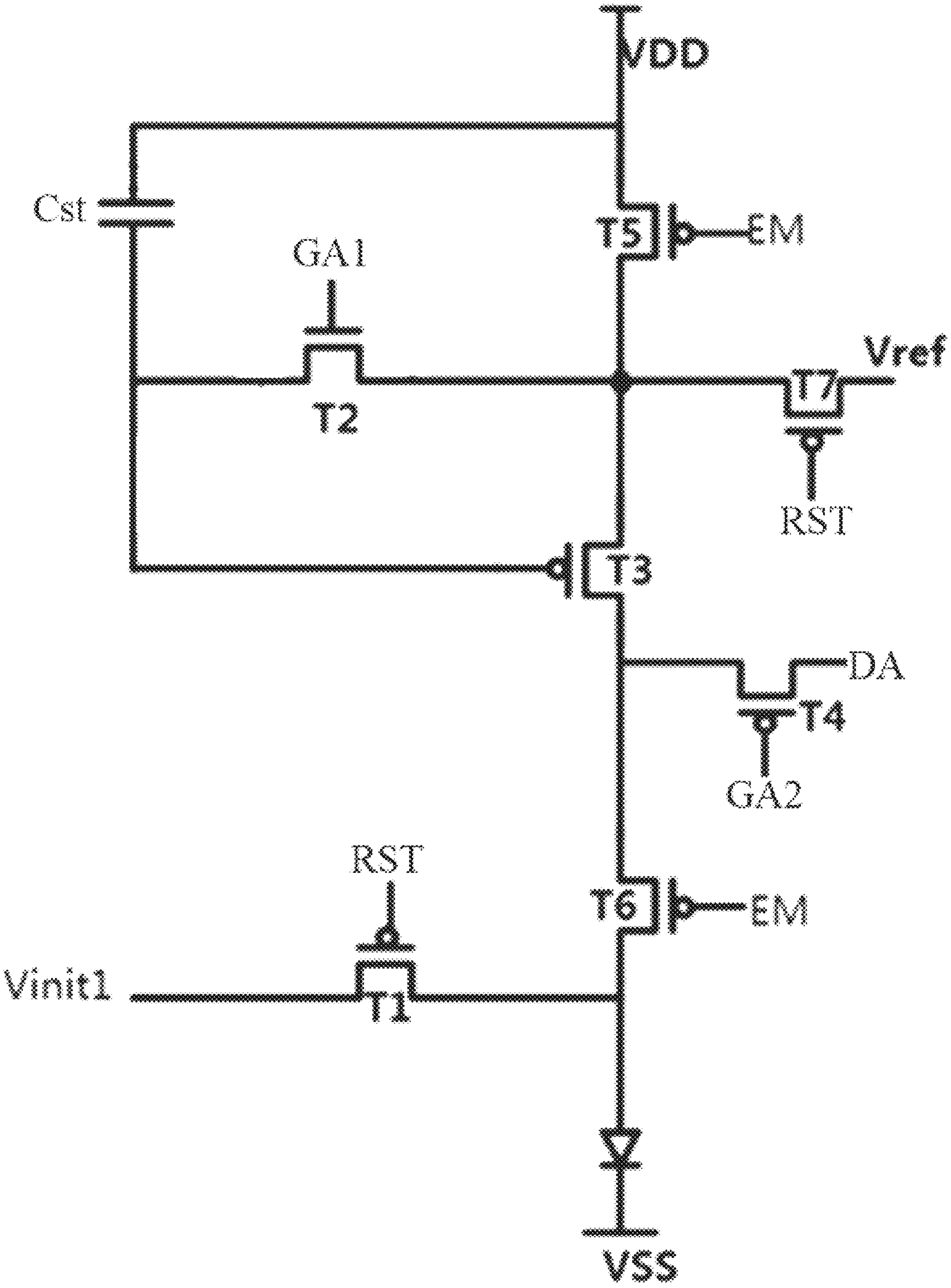
FIG. 3 is a circuit diagram of a subpixel driving circuit according to one embodiment of the present disclosure.

As shown in FIG. 3, the subpixel driving circuit includes a first transistor T1 to a seventh transistor T7, and a storage capacitor.

A gate electrode of the first transistor T1 is coupled to a corresponding resetting signal line RST, a first electrode of the first transistor T1 is coupled to an initialization signal line Vinit1, and a second electrode of the first transistor T1 is coupled to an anode of a corresponding light-emitting element.

A gate electrode of the second transistor T2 is coupled to a corresponding first scanning line GA1, a first electrode of the second transistor T2 is coupled to a first electrode of the third transistor T3, and a second electrode of the second transistor T2 is coupled to a gate electrode T3-*g* of the third transistor T3.

A gate electrode of the fourth transistor T4 is coupled to a corresponding second scanning line GA2, a first electrode of the fourth transistor T4 is coupled to a corresponding data line DA, and a second electrode of the fourth transistor T4 is coupled to a second electrode of the third transistor T3.

A gate electrode of the fifth transistor T5 is coupled to a corresponding light-emission control signal line EM, a first electrode of the fifth transistor T5 is coupled to the power source layer VDD, and a second electrode of the fifth transistor T5 is coupled to the first electrode of the third transistor T3.

A gate electrode of the sixth transistor T6 is coupled to a corresponding light-emission control signal line EM, a first electrode of the sixth transistor T6 is coupled to the second electrode of the third transistor T3, and a second electrode of the sixth transistor T6 is coupled to an anode of a corresponding light-emitting element.

A gate electrode of the seventh transistor T7 is coupled to a corresponding resetting signal line RST, a first electrode of the seventh transistor T7 is coupled to a corresponding reference signal line, and a second electrode of the seventh transistor T7 is coupled to the first electrode of the third transistor T3.

A first plate Cst1 of the storage capacitor Cst is coupled to the gate electrode of the third transistor T3, and a second plate Cst2 of the storage capacitor Cst is coupled to the power source layer VDD. For example, the gate electrode of the third transistor T3 is reused as the first plate Cst1 of the storage capacitor Cst.

It should be appreciated that, in two adjacent subpixel driving circuits arranged in the first direction, the first transistor T1 in a current subpixel driving circuit and the seventh transistor T7 in a next subpixel driving circuit share a same resetting signal line RST.

Figure 5:
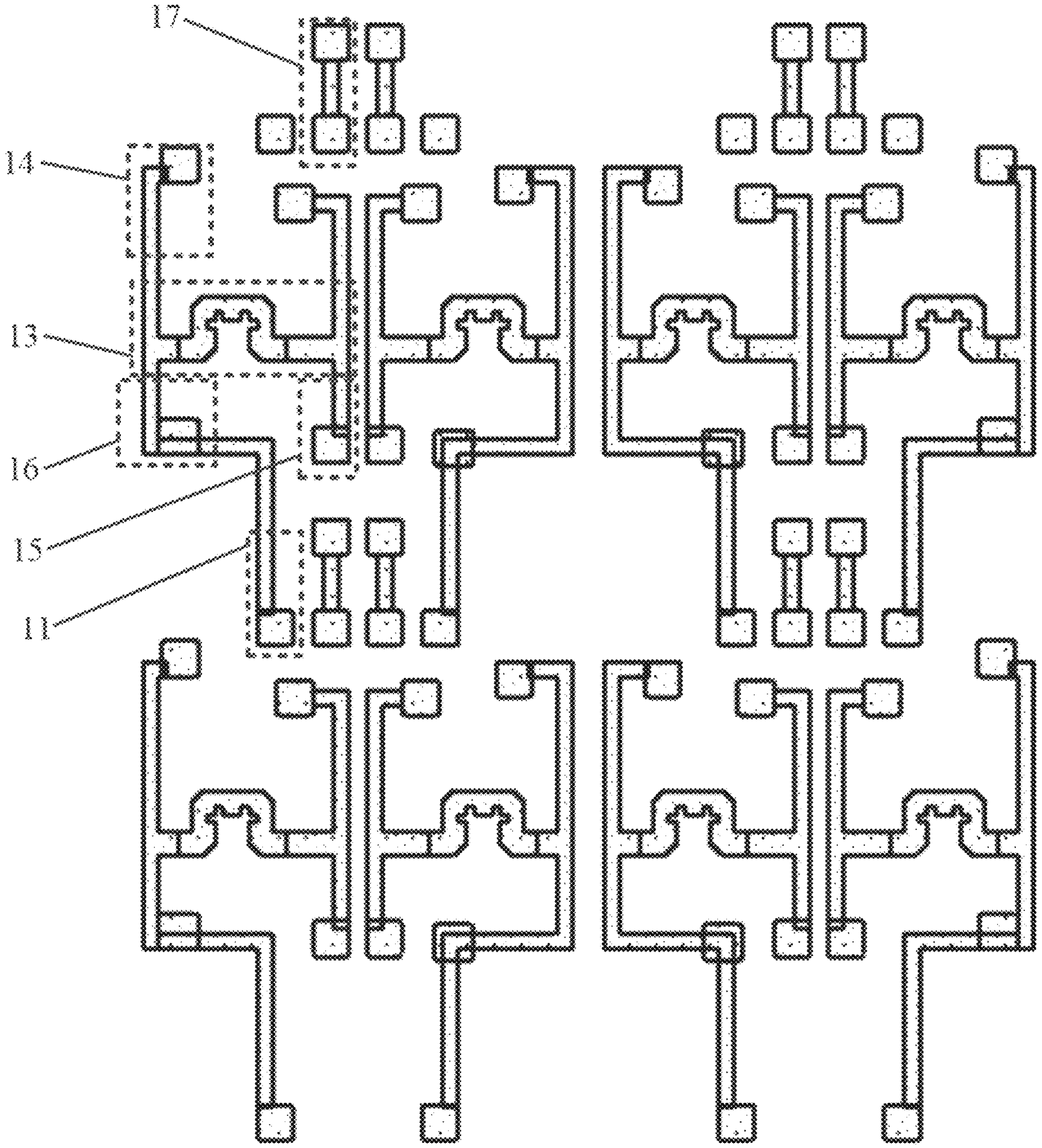
FIG. 5 is a schematic view showing the layout of a poly-silicon active layer in FIG. 4.
Figure 6:
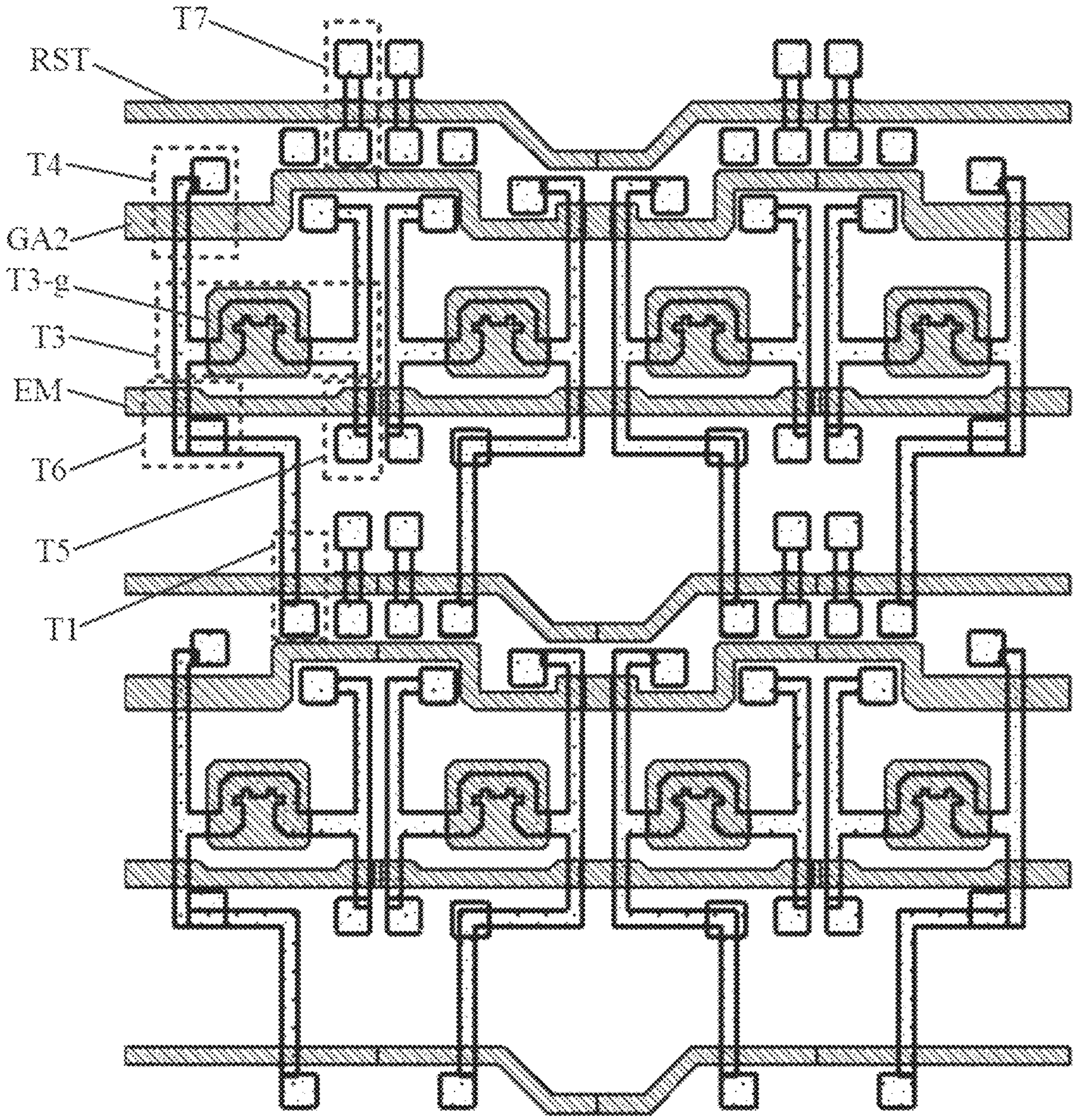
FIG. 6 is a schematic view showing the layout of the poly-silicon active layer and a first gate metal layer in FIG. 4.

FIG. 5 shows a first active layer 11 of the first transistor T1, a third active layer 13 of the third transistor T3, a fourth active layer 14 of the fourth transistor T4, a fifth active layer 15 of the fifth transistor T5, a sixth active layer 15 of the sixth transistor T6, and a seventh active layer 17 of the seventh transistor T7.

Figure 9:
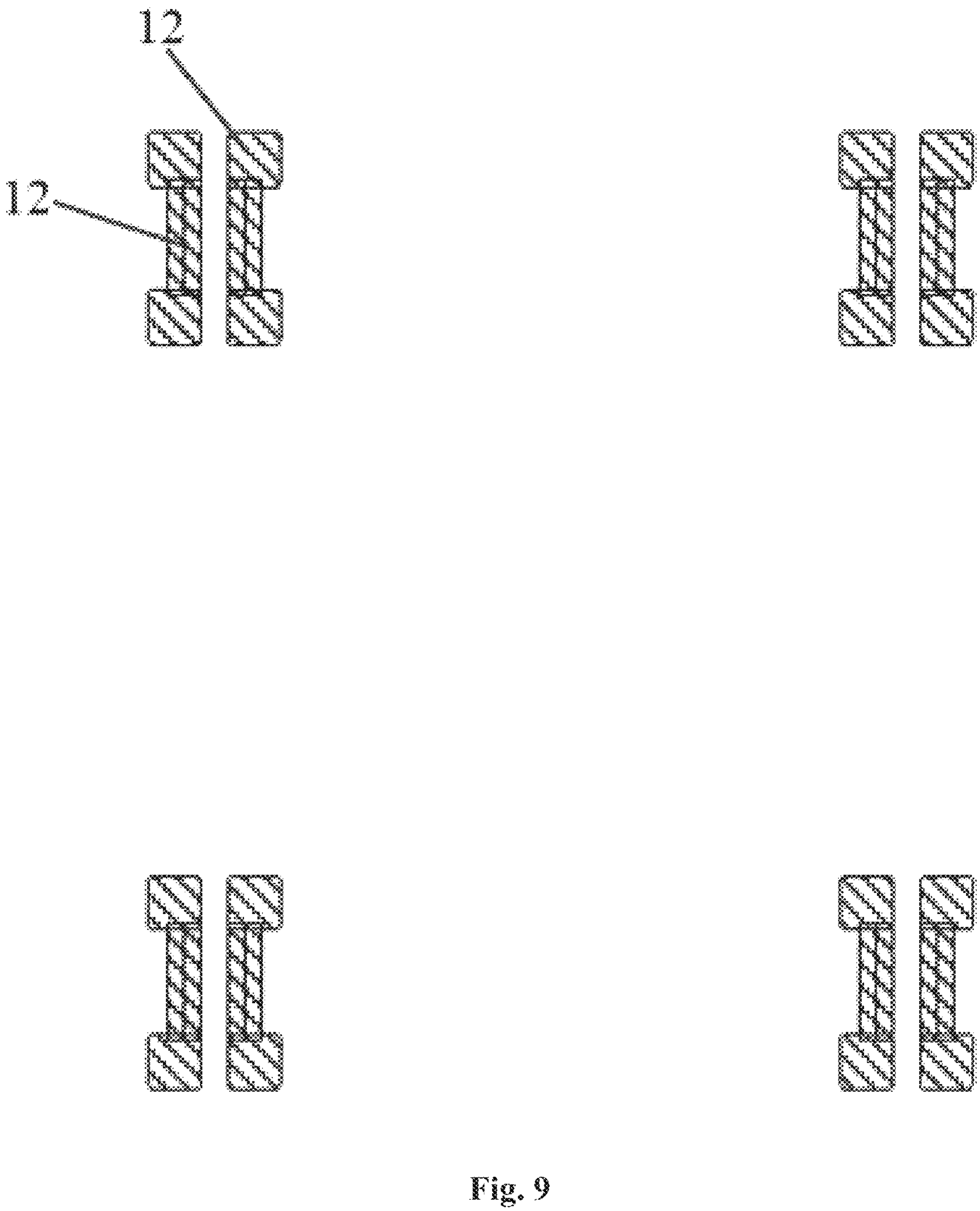
FIG. 9 is a schematic view showing the layout of an oxide active layer in FIG. 4.

FIG. 9 shows a second active layer 12 of the second transistor T2. The second transistor T2 is an oxide transistor.

FIG. 14 shows a first adaption pattern 51, a second adaption pattern 52, a third adaption pattern 53, a fourth adaption pattern 54, a fifth adaption pattern 55, a sixth adaption pattern 56, a seventh adaption pattern 57, an eighth adaption pattern 58 and a ninth adaption pattern 59.

As shown in FIGS. 11 to 16, a first end 511 of the first adaption pattern 51 is coupled to the gate electrode T3-*g* of the third transistor T3 through a seventh via-hole Via7, and a second end 512 of the first adaption pattern 51 is coupled to the second electrode of the second transistor T2 through a sixth via-hole Via6.

The second adaption pattern 52 is coupled to the first electrode of the seventh transistor T7 through a first via-hole Via1, and the second adaption pattern 52 is coupled to the reference signal line Vref through a thirteenth via-hole Via13.

The third adaption pattern 53 is coupled to the initialization signal line Vinit1 through an eleventh via-hole Via11, and the third adaption pattern 53 is coupled to the first electrode of the first transistor T1 through a twelfth via-hole Via12.

The fourth adaption pattern 54 is coupled to the second electrode of the seventh transistor T7 through a second via-hole Via2, and the fourth adaption pattern 54 is coupled to the first electrode of the third transistor T3 through a fourth via-hole Via4, and coupled to the first electrode of the second transistor T2 through a fifth via-hole Via5.

The fifth adaption pattern 55 is coupled to the first electrode of the fourth transistor T4 through a third via-hole Via3.

The sixth adaption pattern 56 is coupled to the second plate Cst2 of the storage capacitor Cst through an eighth via-hole Via8, and the sixth adaption pattern 56 is coupled to the first electrode of the fifth transistor T5 through a tenth via-hole Via10.

The seventh adaption pattern 57 is coupled to the second electrode of the sixth transistor T6 through a ninth via-hole Via9.

The eighth adaption pattern 58 and the third adaption pattern 53 form an integral piece, and the eighth adaption pattern 58 is coupled to the initialization signal line Vinit1 to form a grid-like structure for transmitting an initialization signal.

The ninth adaption pattern 59 and the second adaption pattern 52 form an integral piece, and the ninth adaption pattern 59 is coupled to the reference signal line Vref to form a grid-like structure for transmitting a reference signal.

FIG. 18 shows a tenth adaption pattern 60 and an eleventh adaption pattern 61.

As shown in FIGS. 17 to 20, the tenth adaption pattern 60 is coupled to the sixth adaption pattern 56 through an eighteenth via-hole Via18, and the eleventh adaption pattern 61 is coupled to the seventh adaption pattern 57 through a nineteenth via-hole Via19.

FIG. 21 shows a twelfth adaption pattern 70. As shown in FIGS. 20 to 23, the twelfth adaption pattern 70 is coupled to the eleventh adaption pattern 61 through a twenty-sixth via-hole Via26.

FIG. 19 shows a fourteenth via-hole Via14, a fifteenth via-hole Via15, a sixteenth via-hole Via16, a seventeenth via-hole Via17, the eighteenth via-hole Via18, the nineteenth via-hole Via19, a twentieth via-hole Via20, a twenty-first via-hole Via21, a twenty-second via-hole Via22, and a twenty-third via-hole Via23.

As shown in FIGS. 17 to 21, in the first subpixel driving circuit Q1 in the first one of the driving circuit rows QH1, the fifth adaption pattern 55 is coupled to the second sub-portion 312 through the fourteenth via-hole Via14.

In the third subpixel driving circuit Q3 in the first one of the driving circuit rows QH1, the fifth adaption pattern 55 is coupled to the tenth sub-portion 352 through the fifteenth via-hole Via15.

In the second subpixel driving circuit Q2 in the first one of the driving circuit rows QH1, the fifth adaption pattern 55 is coupled to the sixth sub-portion 332 through the sixteenth via-hole Via16.

In the fourth subpixel driving circuit Q4 in the first one of the driving circuit rows QH1, the fifth adaption pattern 55 is coupled to the fourteenth sub-portion 372 through the seventeenth via-hole Via17.

In the second subpixel driving circuit Q2 in the second one of the driving circuit rows QH1, the fifth adaption pattern 55 is coupled to the eighth sub-portion 342 through the twentieth via-hole Via20.

In the third subpixel driving circuit Q3 in the second one of the driving circuit rows QH2, the fifth adaption pattern 55 is coupled to the twelfth sub-portion 362 through the twenty-first via-hole Via21.

In the first subpixel driving circuit Q1 in the second one of the driving circuit rows QH2, the fifth adaption pattern 55 is coupled to the fourth sub-portion 322 through the twenty-second via-hole Via22.

In the fourth subpixel driving circuit Q4 in the second one of the driving circuit rows QH2, the fifth adaption pattern 55 is coupled to the sixteenth sub-portion 382 through the twenty-third via-hole Via23.

FIG. 22 shows a twenty-fourth via-hole Via24, a twenty-fifth via-hole Via25, a twenty-sixth via-hole Via26, a twenty-seventh via-hole Via27, a twenty-eighth via-hole Via28, a twenty-ninth via-hole Via29, a thirtieth via-hole Via30, a thirty-first via-hole Via31, a thirty-second via-hole Via32, a thirty-third via-hole Via33, and a thirty-fifth via-hole Via35.

As shown in FIGS. 20 to 23, the first conductive connection member 31 is coupled to the first data line DA1 through the twenty-fourth via-hole Via24.

The third conductive connection member 33 is coupled to the second data line DA2 through the twenty-fifth via-hole Via25.

The twelfth adaption pattern 70 is coupled to the eleventh adaption pattern 61 through the twenty-sixth via-hole Via26.

The second conductive connection member 32 is coupled to the first data line DA1 through the twenty-seventh via-hole Via27.

The fourth conductive connection member 34 is coupled to the second data line DA2 through the twenty-eighth via-hole Via28.

The fifth conductive connection member 35 is coupled to the third data line DA3 through the twenty-ninth via-hole Via29.

The seventh conductive connection member 37 is coupled to the fourth data line DA4 through the thirtieth via-hole Via30.

The eighth conductive connection member 38 is coupled to the fourth data line DA4 through the thirty-first via-hole Via31.

The sixth conductive connection member 36 is coupled to the third data line DA3 through the thirty-second via-hole Via32.

The first power source line VDD1 is coupled to the second power source line VDD2 through the thirty-third via-hole Via33.

The tenth adaption pattern 60 is coupled to the second power source line VDD2 through the thirty-fifth via-hole Via35.

FIG. 25 shows a thirty-fourth via-hole Via34. As shown in FIGS. 23 to 26, the twelfth adaption pattern 70 is coupled to an anode ANO through the thirty-fourth via-hole Via34.

As shown in FIG. 27, for example, the display substrate includes a buffer layer BF, a poly-silicon active layer poly, a first gate insulation layer GI1, a first gate metal layer gate1, a second gate insulation layer GI2, a second gate metal layer gate2, a third gate insulation layer GI3, an oxide active layer ACT, a fourth gate insulation layer GI4, a third gate metal layer gate3, an interlayer insulation layer ILD, a first source/drain metal layer SD1, a first planarization layer PLN1, a second source/drain metal layer SD2, a second planarization layer PLN2, a third source/drain metal layer SD3, a third planarization layer PLN3, an anode layer ANO, a pixel definition layer PDL, a light-emitting functional layer EL, a cathode layer cath, a first inorganic encapsulation layer CVD1, an organic encapsulation layer IJP, and a second inorganic encapsulation layer CVD2 laminated one on another in a direction away from the base substrate 90. The display substrate may also include a passivation layer PVX, depending on the practical needs.

It should be appreciated that, in two adjacent driving circuit columns, the subpixel driving circuits are arranged symmetrically.

The present disclosure further provides in some embodiments a display device, which includes the above-mentioned display substrate.

It should be appreciated that, the display device may be any product or member having a display function, e.g., television, display, digital photo frame, mobile phone or tablet computer. The display device further includes a flexible circuit board, a printed circuit board and a back plate.

According to the display substrate in the embodiments of the present disclosure, the data lines coupled to the subpixel driving circuits in the column unit are arranged at the first side and/or the second side of the column unit, so that the data line is arranged far away from the subpixel driving circuits in the column unit. In a case that the data signal transmitted by the data line changes, it is able to reduce the influence on the stability of the key nodes in the subpixel driving circuits, thereby to ensure the stability of the subpixel driving circuit.

In a case that the display device includes the display substrate, it also has the above-mentioned beneficial effects, which will not be particularly defined herein.

It should be appreciated that, in the case that a signal line extends along a direction X, it means that a primary portion of the signal line, e.g., a line, a segment or a strip-like body, extends along the direction X, and an extension length of the primary portion is greater than an extension length of a secondary portion of the signal line, which is coupled to the primary portion, in the other direction.

It should be further appreciated that, the expression "at a same layer" refers to that the film layers are arranged on a same structural layer. Alternatively, for example, the film layers on a same layer may be layer structures formed through forming thin layers for forming specific patterns through a single-film-forming process and then patterning the film layers with a same mask through a single patterning process Depending on different specific patterns, a single patterning process may include multiple exposing, development or etching processes, and the specific patterns in the layer structure may be continuous or discontinuous. These specific patterns may also be arranged at different levels or have different thicknesses.

In the embodiments of the present disclosure, the order of the steps is not limited to the serial numbers thereof. For a person skilled in the art, any change in the order of the steps shall also fall within the scope of the present disclosure if without any creative effort.

It should be further appreciated that, the above embodiments have been described in a progressive manner, and the same or similar contents in the embodiments have not been repeated, i.e., each embodiment has merely focused on the difference from the others. Especially, the method embodiments are substantially similar to the product embodiments, and thus have been described in a simple manner.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above embodiments are for illustrative purposes only, but the present disclosure is not limited thereto. A person skilled in the art may make further alterations and replacements without departing from the spirit of the present disclosure, and these alterations and replacements shall also fall within the scope of the present disclosure. Hence, the scope of the present disclosure shall be subject to the scope of the appended claims.

What is claimed is:

1. A display substrate, comprising a base substrate, and a plurality of subpixels and a plurality of data lines arranged on the base substrate, each of the subpixels comprising a subpixel driving circuit and a light-emitting element coupled to each other, wherein plurality of subpixel driving circuits comprised in the plurality of subpixels comprises a plurality of driving circuit columns, each of the driving circuit columns comprises a plurality of subpixel driving circuits arranged in a first direction, the plurality of driving circuit columns comprises a plurality of column units, each of the column units comprises at least two driving circuit columns proximate to each other, the data lines coupled to the subpixel driving circuits comprised in the column unit are located at a first side and/or a second side of the column unit, the first side is opposite to the second side in a second direction, and the second direction intersects the first direction;

wherein the column unit comprises at least one first driving circuit column and at least one second driving circuit column, and the first driving circuit columns and the second driving circuit columns are arranged alternately in the second direction;

the first driving circuit column comprises a plurality of first subpixel driving circuits and a plurality of second subpixel driving circuits, the first subpixel driving circuits and the second subpixel driving circuits are arranged alternately in the first direction, the first subpixel driving circuit is coupled to a first-color light-emitting element, the second subpixel driving circuit is coupled to a second-color light-emitting element, the first subpixel driving circuits in the first driving circuit column are coupled to a same data line, and the second subpixel driving circuits in the first driving circuit column are coupled to a same data line; and the subpixel driving circuit in the second driving circuit column is coupled to a third-color light-emitting element, and the subpixel driving circuits in the second driving circuit column are coupled to a same data line;

wherein the data line coupled to the first subpixel driving circuits in the first driving circuit column and the data line coupled to the second subpixel driving circuits in the first driving circuit column are arranged at the first side of the column unit, and the data line coupled to the subpixel driving circuits in the second driving circuit column are arranged at the second side of the column unit;

wherein the column unit comprises two first driving circuit columns and two second driving circuit columns, the first subpixel driving circuits comprised in the two first driving circuit columns are coupled to a same first data line, the second subpixel driving circuits comprised in the two first driving circuit columns are coupled to a same second data line, third subpixel driving circuits comprised in a first one of the second driving circuit columns are coupled to a same third data line, and fourth subpixel driving circuits comprised in a second one of the second driving circuit columns are coupled to a same fourth data line; and the first data line, the second data line, the third data line and the fourth data line are arranged sequentially in the second direction;

wherein the column unit comprises a plurality of sub-units arranged sequentially in the first direction, and each of the sub-units comprises two driving circuit rows arranged in the first direction;

a first one of the driving circuit rows comprises the first subpixel driving circuit, the third subpixel driving circuit, the second subpixel driving circuit and the fourth subpixel diving circuit arranged sequentially in the second direction, and a second one of the driving circuit rows comprises the second subpixel driving circuit, the third subpixel driving circuit, the first subpixel driving circuit and the fourth subpixel driving circuit arranged sequentially in the second direction; and the first data line and the second data line are arranged at the first side of the column unit, and the third data line and the fourth data line are arranged at the second side of the column unit.

2. The display substrate according to claim 1, wherein the first subpixel driving circuit in the first one of the driving circuit rows comprises a driving transistor and a data write-in transistor, a second electrode of the data write-in transistor is coupled to a second electrode of the driving transistor, and the first data line is coupled to a first electrode of the data write-in transistor via a first conductive connection member; and the data write-in transistor comprises a data write-in active layer, and an orthogonal projection of the data write-in active layer onto the base substrate is arranged between a first data body comprised in the first data line onto the base substrate and an orthogonal projection of a second data body comprised in the second data line onto the base substrate.

3. The display substrate according to claim 2, further comprising a reference signal line and an initialization signal line, wherein the first conductive connection member comprises a first sub-portion and a second sub-portion coupled to each other, the first sub-portion extends in the second direction, the second sub-portion extends in the first direction, the first sub-portion is coupled to the first data line, and the second sub-portion is coupled to the first electrode of the data write-in transistor; and at least a part of an orthogonal projection of the first sub-portion onto the base substrate is arranged between an orthogonal projection of the reference signal line onto the base substrate and an orthogonal projection of the initialization signal line onto the base substrate.

4. The display substrate according to claim 1, wherein the first subpixel driving circuit in the second one of the driving circuit rows comprises a driving transistor and a data write-in transistor, a second electrode of the data write-in transistor is coupled to a second electrode of the driving transistor, and the first data line is coupled to a first electrode of the data write-in transistor via a second conductive connection member; and the data write-in transistor comprises a data write-in active layer, and an orthogonal projection of the data write-in active layer onto the base substrate is arranged between an orthogonal projection of a second data body comprised in the second data line onto the base substrate and an orthogonal projection of a third data body comprised in the third data line onto the base substrate, wherein the second conductive connection member comprises a third sub-portion and a fourth sub-portion coupled to each other, a least a part of the third sub-portion extends in the second direction, a least a part of the fourth sub-portion surrounds a sensing aperture region of the display substrate, the third sub-portion is coupled to the first data line, and the fourth sub-portion is coupled to the first electrode of the data write-in transistor, wherein the display substrate further comprises a reference signal line and an initialization signal line, wherein an orthogonal projection of the third sub-portion onto the base substrate is arranged between an orthogonal projection of the reference signal line onto the base substrate and an orthogonal projection of the initialization signal line onto the base substrate; and an orthogonal projection of the fourth sub-portion onto the base substrate at least partially overlaps with the orthogonal projection of the initialization signal line onto the base substrate, and/or the orthogonal projection of the fourth sub-portion onto the base substrate at least partially overlaps with the orthogonal projection of the reference signal line onto the base substrate.

5. The display substrate according to claim 1, wherein the second subpixel driving circuit in the first one of the driving circuit rows comprises a driving transistor and a data write-in transistor, a second electrode of the data write-in transistor is coupled to a second electrode of the driving transistor, and the second data line is coupled to a first electrode of the data write-in transistor via a third conductive connection member; and the data write-in transistor comprises a data write-in active layer, and an orthogonal projection of the data write-in active layer onto the base substrate is arranged between an orthogonal projection of a second data body comprised in the second data line onto the base substrate and an orthogonal projection of a third data body comprised in the third data line onto the base substrate, wherein the display substrate further comprises a first scanning line, wherein the second subpixel driving circuit in the first one of the driving circuit rows further comprises a compensation transistor, a first electrode of the compensation transistor is coupled to a first electrode of the driving transistor, a second electrode of the compensation transistor is coupled to a gate electrode of the driving transistor, and a gate electrode of the compensation transistor is coupled to a corresponding first scanning line; and the third conductive connection member comprises a fifth sub-portion and a sixth sub-portion coupled to each other, the fifth sub-portion is coupled to the second data line, the sixth sub-portion is coupled to the first electrode of the data write-in transistor, and an orthogonal projection of the fifth sub-portion onto the base substrate at least partially overlaps with an orthogonal projection of the first scanning line onto the base substrate.

6. The display substrate according to claim 1, wherein the second subpixel driving circuit in the second one of the driving circuit rows comprises a driving transistor and a data write-in transistor, a second electrode of the data write-in transistor is coupled to a second electrode of the driving transistor, and the second data line is coupled to a first electrode of the data write-in transistor via a fourth conductive connection member; and the data write-in transistor comprises a data write-in active layer, and an orthogonal projection of the data write-in active layer onto the base substrate is arranged between an orthogonal projection of a first data body comprised in the first data line onto the base substrate and an orthogonal projection of a second data body comprised in the second data line onto the base substrate, wherein the display substrate further comprises a second scanning line, wherein a gate electrode of the data write-in transistor is coupled to a corresponding second scanning line;

the fourth conductive connection member comprises a seventh sub-portion and an eighth sub-portion coupled to each other, the seventh sub-portion extends in the second direction, the eighth sub-portion extends in the first direction, the seventh sub-portion is coupled to the second data line, and the eighth sub-portion is coupled to the first electrode of the data write-in transistor; and at least a part of the seventh sub-portion onto the base substrate is arranged between an orthogonal projection of the second scanning line onto the base substrate and an orthogonal projection of a gate electrode of the driving transistor onto the base substrate.

7. The display substrate according to claim 1, wherein the third subpixel driving circuit in the first one of the driving circuit rows comprises a driving transistor and a data write-in transistor, a second electrode of the data write-in transistor is coupled to a second electrode of the driving transistor, and the third data line is coupled to a first electrode of the data write-in transistor via a fifth conductive connection member; and the data write-in transistor comprises a data write-in active layer, and an orthogonal projection of the data write-in active layer onto the base substrate is arranged between an orthogonal projection of a second data body comprised in the second data line onto the base substrate and an orthogonal projection of a third data body comprised in the third data line onto the base substrate, wherein the fifth conductive connection member comprises a ninth sub-portion and a tenth sub-portion coupled to each other, at least a part of the ninth sub-portion extends in the second direction, at least a part of the tenth sub-portion surrounds a sensing aperture region of the display substrate, the ninth sub-portion is coupled to the third data line, and the tenth sub-portion is coupled to the first electrode of the data write-in transistor, wherein the display substrate further comprises a reference signal line and an initialization signal line, and at least a part of an orthogonal projection of the ninth sub-portion onto the base substrate is arranged between an orthogonal projection of the reference signal line onto the base substrate and an orthogonal projection of the initialization signal line onto the base substrate; and an orthogonal projection of the tenth sub-portion onto the base substrate at least partially overlaps with the orthogonal projection of the initialization signal line onto the base substrate, and/or the orthogonal projection of the tenth sub-portion onto the base substrate at least partially overlaps with the orthogonal projection of the reference signal line onto the base substrate.

8. The display substrate according to claim 1, wherein the third subpixel driving circuit in the second one of the driving circuit rows comprises a driving transistor and a data write-in transistor, a second electrode of the data write-in transistor is coupled to a second electrode of the driving transistor, and the third data line is coupled to a first electrode of the data write-in transistor via a sixth conductive connection member; and the data write-in transistor comprises a data write-in active layer, and an orthogonal projection of the data write-in active layer onto the base substrate is arranged between an orthogonal projection of a second data body comprised in the second data line onto the base substrate and an orthogonal projection of a third data body comprised in the third data line onto the base substrate, wherein the display substrate further comprises a second scanning line, wherein a gate electrode of the data write-in transistor is coupled to a corresponding second scanning line;

the sixth conductive connection member comprises an eleventh sub-portion and a twelfth sub-portion coupled to each other, the eleventh sub-portion extends in the second direction, the twelfth sub-portion extends in the first direction, the eleventh sub-portion is coupled to the third data line, and the twelfth sub-portion is coupled to the first electrode of the data write-in transistor; and at least a part of an orthogonal projection of the eleventh sub-portion onto the base substrate is arranged between an orthogonal projection of the second scanning line onto the base substrate and an orthogonal projection of a gate electrode of the driving transistor onto the base substrate.

9. The display substrate according to claim 1, wherein the fourth subpixel driving circuit in the first one of the driving circuit rows comprises a driving transistor and a data write-in transistor, a second electrode of the data write-in transistor is coupled to a second electrode of the driving transistor, and the fourth data line is coupled to a first electrode of the data write-in transistor via a seventh conductive connection member; and the data write-in transistor comprises a data write-in active layer, and an orthogonal projection of the data write-in active layer onto the base substrate is arranged between an orthogonal projection of a third data body comprised in the third data line onto the base substrate and an orthogonal projection of a fourth data body comprised in the fourth data line onto the base substrate, wherein the display substrate further comprises a first scanning line, wherein the fourth subpixel driving circuit in the first one of the driving circuit rows further comprises a compensation transistor, a first electrode of the compensation transistor is coupled to a first electrode of the driving transistor, a second electrode of the compensation transistor is coupled to a gate electrode of the driving transistor, and a gate electrode of the compensation transistor is coupled to a corresponding first scanning line; and the seventh conductive connection member comprises a thirteenth sub-portion and a fourteenth sub-portion coupled to each other, the thirteenth sub-portion is coupled to the fourth data line, the fourteenth sub-portion is coupled to the first electrode of the data write-in transistor, and an orthogonal projection of the thirteenth sub-portion onto the base substrate at least partially overlaps with an orthogonal projection of the first scanning line onto the base substrate.

10. The display substrate according to claim 1, wherein the fourth subpixel driving circuit in the second one of the driving circuit rows comprises a driving transistor and a data write-in transistor, a second electrode of the data write-in transistor is coupled to a second electrode of the driving transistor, and the fourth data line is coupled to a first electrode of the data write-in transistor via an eighth conductive connection member; and the data write-in transistor comprises a data write-in active layer, and an orthogonal projection of the data write-in active layer onto the base substrate is arranged between an orthogonal projection of a third data body comprised in the third data line onto the base substrate and an orthogonal projection of a fourth data body comprised in the fourth data line onto the base substrate, wherein the display substrate further comprises a reference signal line and an initialization signal line, wherein the eighth conductive connection member comprises a fifteenth sub-portion and a sixteenth sub-portion coupled to each other, at least a part of the fifteenth sub-portion extends in the second direction, at least a part of the sixteenth sub-portion extends in the first direction, the fifteenth sub-portion is coupled to the fourth data line, and the sixteenth sub-portion is coupled to the first electrode of the data write-in transistor; and at least a part of an orthogonal projection of the fifteenth sub-portion onto the base substrate is arranged between an orthogonal projection of the reference signal line onto the base substrate and an orthogonal projection of the initialization signal line onto the base substrate.

11. The display substrate according to claim 1, wherein each of the subpixel driving circuits in the display substrate comprises a driving transistor and a compensation transistor, a first electrode of the compensation transistor is coupled to a first electrode of the driving transistor, a second electrode of the compensation transistor is coupled to a gate electrode of the driving transistor via a first adaption pattern, and at least a part of an orthogonal projection of the first adaption pattern onto the base substrate is arranged between an orthogonal projection of the second data line onto the base substrate and an orthogonal projection of the third data line onto the base substrate.

12. The display substrate according to claim 11, wherein the first adaption pattern comprises a first end, a second end and a connection member coupled to the first end and the second end, the first end is coupled to the gate electrode of the driving transistor, the second end is coupled to the second electrode of the compensation transistor, and the connection member extends in the second direction.

13. The display substrate according to claim 12, further comprising a power source layer, wherein an orthogonal projection of the power source layer onto the base substrate covers the orthogonal projection of the first adaption pattern onto the base substrate, wherein the power source layer comprises a plurality of first power source lines and a plurality of second power source lines, each of the first power source lines cross the second power source lines, and the first power source line is coupled to the second power source lines;

an orthogonal projection of the first power source line onto the base substrate covers an orthogonal projection of the first end onto the base substrate, and/or the orthogonal projection of the first power source line onto the base substrate at least partially overlaps with an orthogonal projection of the connection member onto the base substrate; and an orthogonal projection of the second power source line onto the base substrate covers an orthogonal projection of the second end onto the base substrate, and/or the orthogonal projection of the second power source line onto the base substrate at least partially overlaps with the orthogonal projection of the connection member onto the base substrate.

14. The display substrate according to claim 11, wherein in a layout region of the first one of the driving circuit rows, an orthogonal projection of the first adaption pattern in a layout region of the second subpixel driving circuit onto the base substrate and an orthogonal projection of the first adaption pattern in a layout region of the third subpixel driving circuit onto the base substrate are both arranged between the orthogonal projection of the second data line onto the base substrate and the orthogonal projection of the third data line onto the base substrate, an orthogonal projection of the first end in a layout region of the first subpixel driving circuit onto the base substrate at least partially overlaps with the orthogonal projection of the second data line onto the base substrate, and an orthogonal projection of the first end in a layout region of the fourth subpixel driving circuit onto the base substrate at least partially overlaps with the orthogonal projection of the third data line onto the base substrate, and/or wherein in a layout region of the second one of the driving circuit rows, an orthogonal projection of the first adaption pattern in a layout region of the first subpixel driving circuit onto the base substrate and an orthogonal projection of the first adaption pattern in a layout region of the third subpixel driving circuit onto the base substrate are both arranged between the orthogonal projection of the second data line onto the base substrate and the orthogonal projection of the third data line onto the base substrate, an orthogonal projection of the first end in a layout region of the second subpixel driving circuit onto the base substrate at least partially overlaps with the orthogonal projection of the second data line onto the base substrate, and an orthogonal projection of the first end in a layout region of the fourth subpixel driving circuit onto the base substrate at least partially overlaps with the orthogonal projection of the third data line onto the base substrate.

15. The display substrate according to claim 1, wherein the display substrate comprises a plurality of first sensing aperture regions and a plurality of second sensing aperture regions, each of the first sensing aperture regions is arranged between a layout region of the second subpixel driving circuit and a layout region of the third subpixel driving circuit in a corresponding first one of the driving circuit rows, and each of the second sensing aperture regions is arranged between a layout region of the first subpixel driving circuit and a layout region of the third subpixel driving circuit in a corresponding second one of the driving circuit rows.

16. A display device, comprising the display substrate according to claim 1.

* * * * *